United States Patent
Laplante et al.

(10) Patent No.: US 10,953,937 B2
(45) Date of Patent: Mar. 23, 2021

(54) TRACK FOR TRACTION OF A VEHICLE

(71) Applicant: CAMSO INC., Magog (CA)

(72) Inventors: Guillaume Laplante, Sherbrooke (CA); Jules Dandurand, Sherbrooke (CA); Andy Levesque, Coaticook (CA)

(73) Assignee: CAMSO INC., Magog (CA)

( * ) Notice: Subject to any disclaimer, the term of this patent is extended or adjusted under 35 U.S.C. 154(b) by 200 days.

(21) Appl. No.: 15/572,046

(22) PCT Filed: May 6, 2016

(86) PCT No.: PCT/CA2016/050525
§ 371 (c)(1),
(2) Date: Nov. 6, 2017

(87) PCT Pub. No.: WO2016/176780
PCT Pub. Date: Nov. 10, 2016

(65) Prior Publication Data
US 2018/0118289 A1    May 3, 2018

Related U.S. Application Data

(60) Provisional application No. 62/157,734, filed on May 6, 2015.

(51) Int. Cl.
B62D 55/24    (2006.01)
B62D 55/26    (2006.01)
B62D 55/28    (2006.01)

(52) U.S. Cl.
CPC .......... *B62D 55/244* (2013.01); *B62D 55/26* (2013.01); *B62D 55/286* (2013.01)

(58) Field of Classification Search
CPC ...... B62D 55/18; B62D 55/24; B62D 55/242; B62D 55/244; B62D 55/253
See application file for complete search history.

(56) References Cited

U.S. PATENT DOCUMENTS

| | | |
|---|---|---|
| 2,378,427 A | 6/1945 | Myers |
| 3,582,154 A | 6/1971 | Russ |
| 3,858,948 A | 1/1975 | Johnson et al. |

(Continued)

FOREIGN PATENT DOCUMENTS

| | | |
|---|---|---|
| JP | S55119572 A | 9/1980 |
| JP | S59118580 A | 7/1984 |

(Continued)

OTHER PUBLICATIONS

International Search Report and Written Opinion dated Jul. 2, 2014 in connextion with International Patent application PCT/CA2014/000262, 11 pages.

(Continued)

*Primary Examiner* — Jason R Bellinger
(74) *Attorney, Agent, or Firm* — Smart & Biggar LLP

(57) ABSTRACT

A track for traction of a vehicle, such as an all-terrain vehicle (ATV), a snowmobile, an agricultural vehicle, etc. The track may have rigidity (i.e., stiffness) characteristics to enhance its traction, floatation, and/or other aspects of its performance. For example, in some embodiments, a lateral bending stiffness of a carcass of the track may be symmetric while a longitudinal bending stiffness of the carcass of the track may be asymmetric.

44 Claims, 33 Drawing Sheets

(56) References Cited

U.S. PATENT DOCUMENTS

| | | |
|---|---|---|
| 6,241,327 B1 | 6/2001 | Lajoie |
| 6,406,106 B1 | 6/2002 | Moss |
| 6,474,755 B1 | 11/2002 | Pringiers |
| 6,722,746 B2 | 4/2004 | Katayama et al. |
| 7,014,279 B2 | 3/2006 | Watanabe |
| 7,044,567 B2 | 5/2006 | Ishibashi |
| 7,367,637 B2 | 5/2008 | Gleasman |
| 7,377,601 B2 | 5/2008 | Katoh et al. |
| 7,784,884 B2 | 8/2010 | Soucy et al. |
| 8,083,296 B2 | 12/2011 | Dandurand |
| 8,191,976 B2 | 6/2012 | Sugihara |
| 8,567,877 B2 | 10/2013 | Ijiri |
| 8,833,873 B2 | 9/2014 | Dandurand et al. |
| 2005/0156466 A1 | 7/2005 | Dandurand et al. |
| 2008/0174176 A1 | 7/2008 | Berg |
| 2009/0224598 A1 | 9/2009 | St-Amant et al. |
| 2009/0302677 A1 | 12/2009 | Sugihara |
| 2011/0316330 A1 | 12/2011 | Doyle |
| 2013/0162016 A1 | 6/2013 | Lajoie |
| 2016/0016621 A1 | 1/2016 | Favre et al. |
| 2019/0106166 A1* | 4/2019 | Favre .................. B62D 55/244 |

FOREIGN PATENT DOCUMENTS

| | | |
|---|---|---|
| JP | 3416327 B2 | 6/2003 |
| WO | 2006112577 | 10/2006 |
| WO | 2014129659 | 8/2014 |
| WO | WO2014/138938 * | 9/2014 |

OTHER PUBLICATIONS

International Search report and written opinion dated Jun. 26, 2014, in connection with International Patent Application PCT/CA2014/000272, 9 pages.

International Search report and written opinion dated Jul. 27, 2016, in connection with International Patent Application PCT/CA2016/050525, 8 pages.

International Search Report and Written Opinion dated Aug. 28, 2014 in connexion with International Patent Application PCT/JP2014/054578—13 pages.

International Search Report and Written Opinion dated Oct. 10, 2006 in connexion with International Patent application PCT/KR2005/003191—16 pages.

Examiner Report dated Feb. 3, 2020 in connection with Canadian Patent Application No. 2,906,937, 3 pages.

* cited by examiner

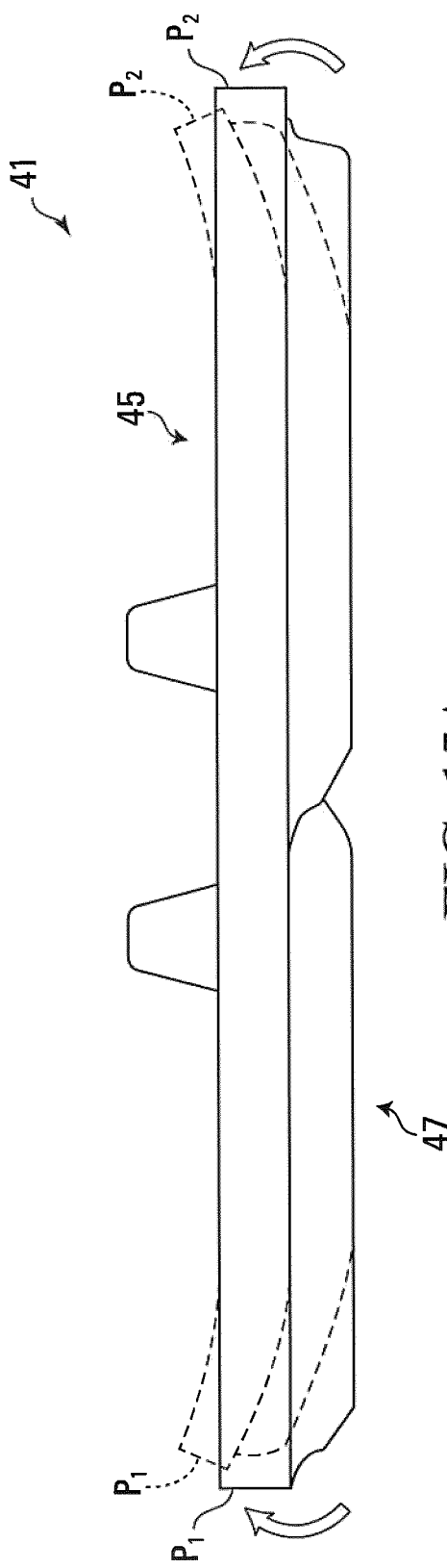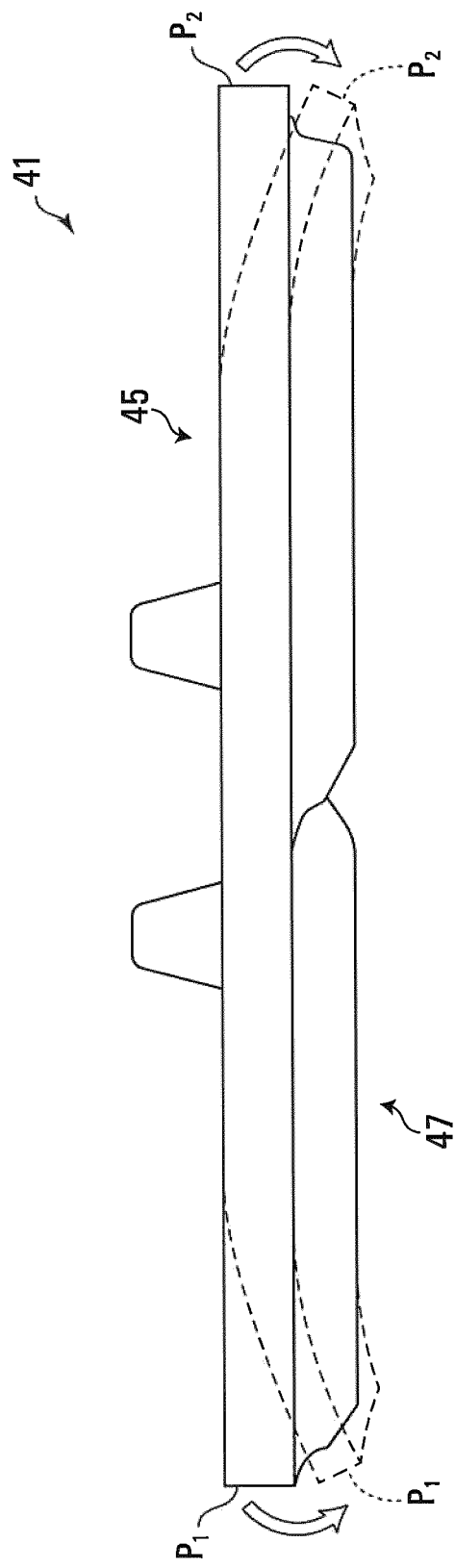

TRACK FOR TRACTION OF A VEHICLE

CROSS-REFERENCE TO RELATED APPLICATION

This application is a national stage application under 35 U.S.C. 371 of PCT Application No. PCT/CA2016/050525 having an international filing date of May 6, 2016, designating the United States and claiming the benefit of priority under 35 USC 119 based on U.S. Provisional Patent Application 62/157,734 filed on May 6, 2015 and hereby incorporated by reference herein.

FIELD

The invention relates generally to off-road vehicles (e.g., all-terrain vehicles (ATVs), snowmobiles, agricultural vehicles, etc.) and, more particularly, to track systems for providing traction to such vehicles.

BACKGROUND

Certain off-road vehicles may be equipped with track systems which enhance their traction and floatation on soft, slippery and/or irregular grounds (e.g., soil, mud, sand, ice, snow, etc.) on which they operate.

For instance, an all-terrain vehicle (ATV) may be equipped with track systems in place of ground-engaging wheels with tires for which it may have been originally designed. Traction, floatation and other performance aspects of the ATV depends on various factors, including its tracks. For example, rigidity characteristics of a track can have a significant influence on traction, floatation and other performance aspects of the ATV. In some cases, this may lead to conflicting requirements or desirable features for the track, such as high rigidity for floatation and traction but yet lower rigidity to manage power consumption as the track bends in motion.

Similar considerations may arise for tracks of other types of off-road vehicles (e.g., snowmobiles, agricultural vehicles, etc.) in certain situations.

For these and other reasons, there is a need to improve tracks for off-road vehicles.

SUMMARY

According to various aspects of the invention, there is provided a track for traction of a vehicle, such as an all-terrain vehicle (ATV), a snowmobile, an agricultural vehicle, etc. The track has rigidity (i.e., stiffness) characteristics to enhance its traction, floatation, and/or other aspects of its performance.

For example, according to an aspect of the invention, there is provided a track for traction of a vehicle. The track comprises a ground-engaging outer surface for engaging the ground, an inner surface opposite to the ground-engaging outer surface, and a plurality of traction projections projecting from the ground-engaging outer surface. A lateral bending stiffness of the track is symmetric and a longitudinal bending stiffness of the track is asymmetric.

According to another aspect of the invention, there is provided a track for traction of a vehicle. The track comprises a carcass which comprises a ground-engaging outer surface for engaging the ground and an inner surface opposite to the ground-engaging outer surface. The track further comprises a plurality of traction projections projecting from the ground-engaging outer surface. A lateral bending stiffness of the carcass is symmetric and a longitudinal bending stiffness of the carcass is asymmetric.

According to another aspect of the invention, there is provided a track for traction of a vehicle. The track comprises a carcass which comprises a ground-engaging outer surface for engaging the ground and an inner surface opposite to the ground-engaging outer surface. The track further comprises a plurality of traction projections projecting from the ground-engaging outer surface. A ratio of a widthwise rigidity of the carcass when subject to loading tending to laterally bend the carcass inwardly over a longitudinal rigidity of the carcass when subject to loading tending to longitudinally bend the carcass outwardly is at least 0.7.

According to another aspect of the invention, there is provided a track for traction of a vehicle. The track comprises a carcass which comprises a ground-engaging outer surface for engaging the ground and an inner surface opposite to the ground-engaging outer surface. The track further comprises a plurality of traction projections projecting from the ground-engaging outer surface. A ratio of a widthwise rigidity of the carcass when subject to loading tending to laterally bend the carcass inwardly over a longitudinal rigidity of the carcass when subject to loading tending to longitudinally bend the carcass outwardly is between 0.8 and 1.2.

According to another aspect of the invention, there is provided a track for traction of a vehicle. The track comprises a carcass which comprises a ground-engaging outer surface for engaging the ground, an inner surface opposite to the ground-engaging outer surface, elastomeric material, and a plurality of reinforcements disposed within the elastomeric material. The track further comprises a plurality of traction projections projecting from the ground-engaging outer surface. A ratio of a spacing of a first one of the reinforcements and a second one of the reinforcements in a thickness direction of the track over a thickness of the carcass is at least 0.4.

According to another aspect of the invention, there is provided a track for traction of a vehicle. The track comprises a carcass which comprises a ground-engaging outer surface for engaging the ground and an inner surface opposite to the ground-engaging outer surface. The track further comprises a plurality of traction projections projecting from the ground-engaging outer surface. A lateral-bending neutral axis of the carcass and a longitudinal-bending neutral axis of the carcass are offset in a thickness direction of the track.

According to another aspect of the invention, there is provided a track for traction of a vehicle. The track comprises a carcass which comprises a ground-engaging outer surface for engaging the ground and an inner surface opposite to the ground-engaging outer surface. The track further comprises a plurality of traction projections projecting from the ground-engaging outer surface. A lateral-bending neutral axis of the carcass is closer to a centerline of the carcass than a longitudinal-bending neutral axis of the carcass in a thickness direction of the track.

According to another aspect of the invention, there is provided a track for traction of a vehicle. The track comprises elastomeric material, a ground-engaging outer surface for engaging the ground, an inner surface opposite to the ground-engaging outer surface, a plurality of traction projections projecting from the ground-engaging outer surface, and a layer of reinforcing fabric disposed within the elastomeric material. The layer of reinforcing fabric is stiffer in a widthwise direction of the track than in a longitudinal direction of the track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 15A and 15B respectively show a cross-sectional view of the track taken along a widthwise direction of the track when the track is subjected to loading tending to laterally bend the track inwardly and outwardly;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1A:
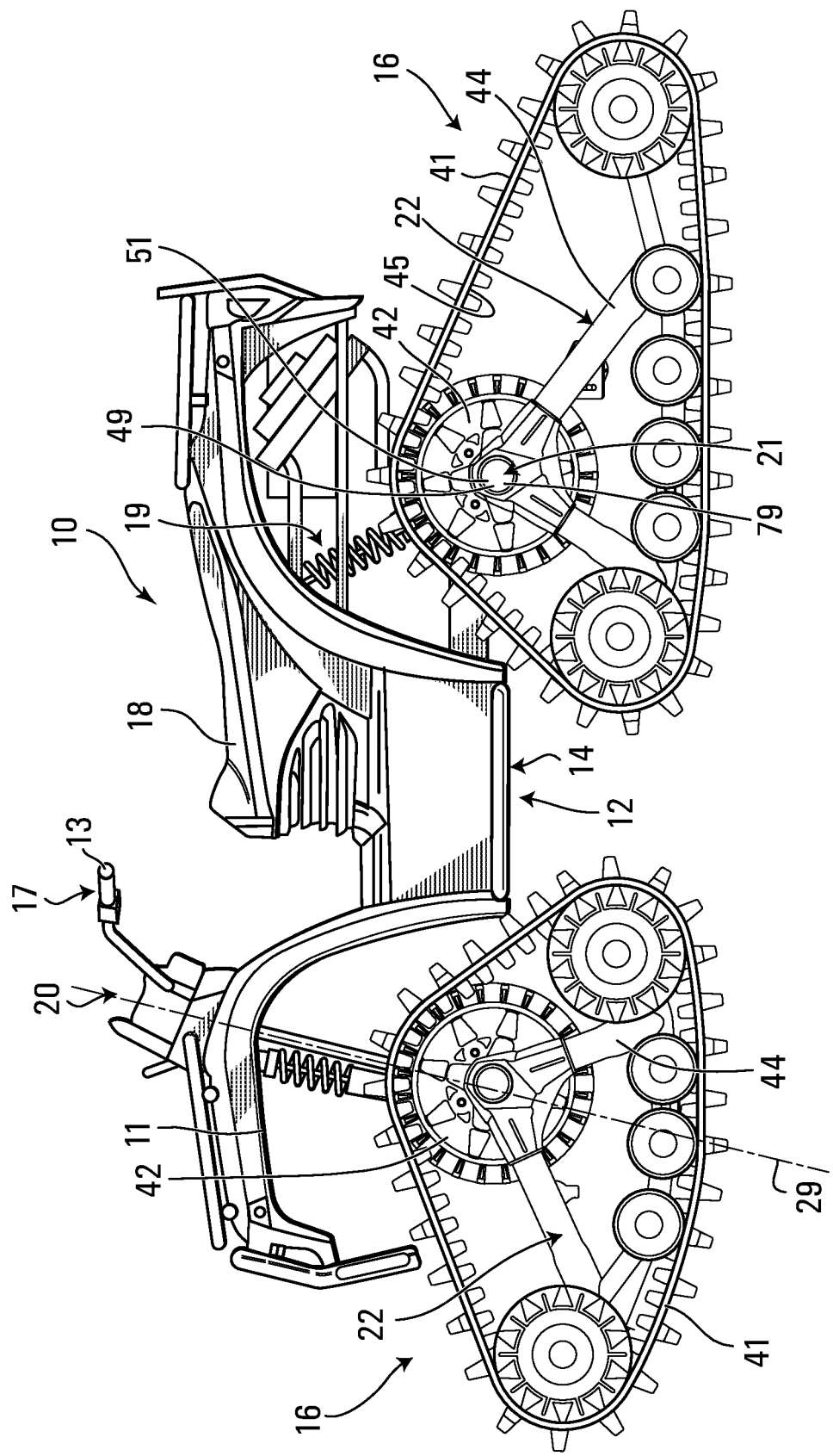
FIGS. 1A and 1B show an example of a tracked vehicle, in this case an all-terrain vehicle (ATV), comprising track systems in accordance with an embodiment of the invention.
Figure 1B:
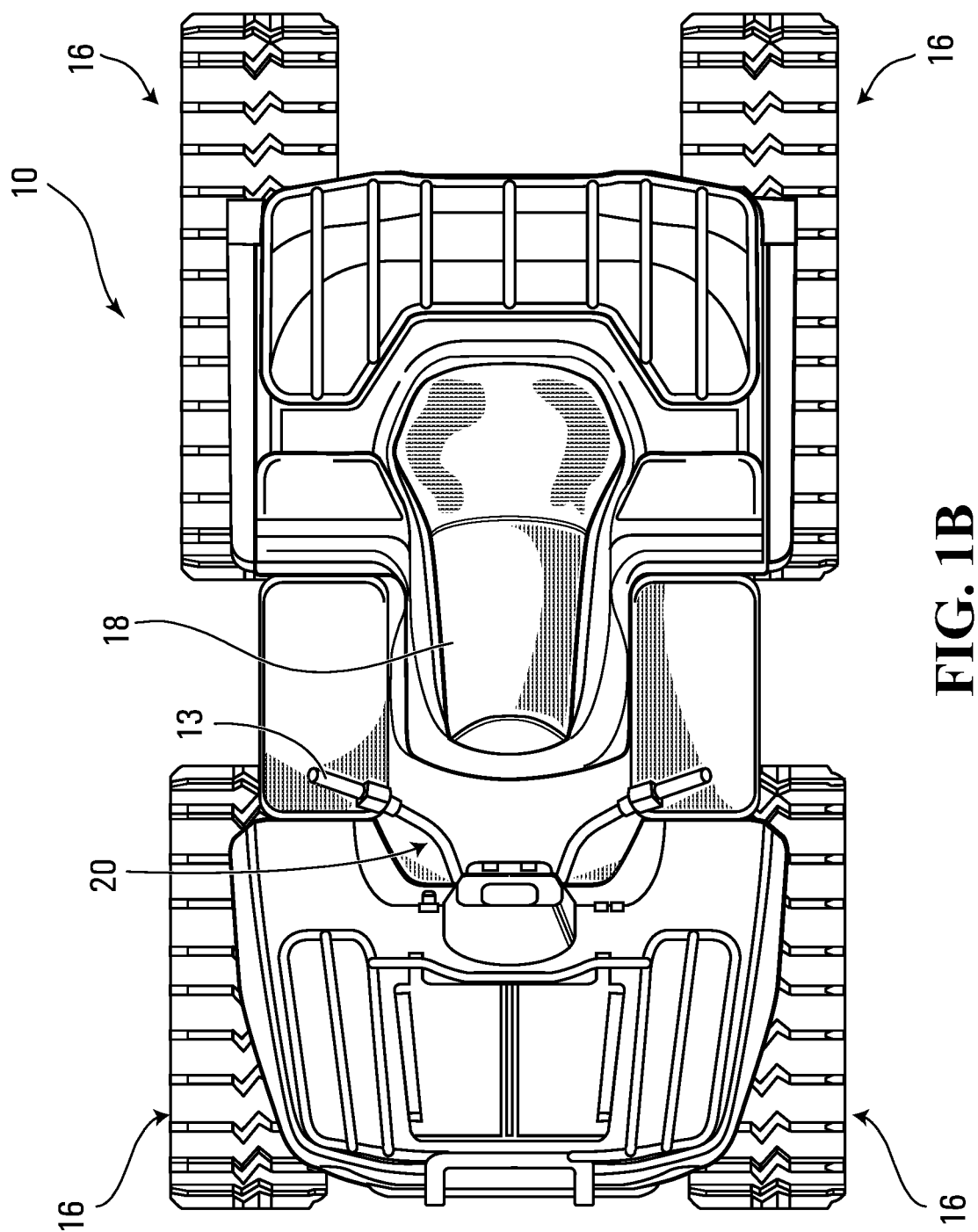

FIGS. 1A and 1B show an example of a tracked vehicle 10 in accordance with an embodiment of the invention. In this embodiment, the vehicle 10 is an all-terrain vehicle (ATV). The ATV 10 is a small open vehicle designed to travel off-road on a variety of terrains, including roadless rugged terrain, for recreational, utility and/or other purposes.

In this embodiment, the ATV 10 comprises a frame 11, a powertrain 12, a steering system 17, a suspension 19, a plurality of track systems 16, a seat 18, and a user interface 20, which enable a user of the ATV to ride the ATV 10 on the ground. The ATV 10 has a longitudinal direction, a widthwise direction, and a height direction.

As further discussed later, in various embodiments, tracks of the track systems 16 may have rigidity (i.e., stiffness) characteristics to enhance traction, floatation, and/or other aspects of performance of the track systems 16.

The powertrain 12 is configured for generating motive power and transmitting motive power to the track systems 16 to propel the ATV 10 on the ground. To that end, the powertrain 12 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with one or more of the track systems 16. That is, the powertrain 12 transmits motive power generated by the prime mover 14 to one or more of the track systems 16 (e.g., via a transmission and/or a differential) in order to drive (i.e., impart motion to) these one or more of the track systems 16.

The steering system 17 is configured to enable the user to steer the ATV 10 on the ground. To that end, the steering system 17 comprises a steering device 13 that is operable by the user to direct the ATV 10 along a desired course on the ground. In this embodiment, the steering device 13 comprises handlebars. The steering device 13 may comprise a steering wheel or any other steering component that can be operated by the user to steer the ATV 10 in other embodiments. The steering system 17 responds to the user interacting with the steering device 13 by turning some of the track systems 16 to change their orientation relative to the frame 11 of the ATV 10 in order to cause the ATV 10 to move in a desired direction. In this example, front ones of the track systems 16 are turnable in response to input of the user at the steering device 13 to change their orientation relative to the frame 11 of the ATV 10 in order to steer the ATV 10 on the ground. More particularly, in this example, each of the front ones of the track systems 16 is pivotable about a steering axis 29 of the ATV 10 in response to input of the user at the steering device 10 in order to steer the ATV 10 on the ground. Rear ones of the track systems 16 are not turned relative to the frame 11 of the ATV 10 by the steering system 17.

The suspension 19 is connected between the frame 11 and the track systems 16 to allow relative motion between the frame 11 and the track systems 16 as the ATV 10 travels on the ground. The suspension 19 enhances handling of the ATV 10 on the ground by absorbing shocks and helping to maintain traction between the track systems 16 and the ground. The suspension 19 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

In this embodiment, the seat 18 is a straddle seat and the ATV 10 is usable by a single person such that the seat 18 accommodates only that person driving the ATV 10. In other embodiments, the seat 18 may be another type of seat, and/or the ATV 10 may be usable by two individuals, namely one person driving the ATV 10 and a passenger, such that the seat 18 may accommodate both of these individuals (e.g., behind one another or side-by-side) or the ATV 10 may comprise an additional seat for the passenger. For example, in other embodiments, the ATV 10 may be a side-by-side ATV, sometimes referred to as a "utility terrain vehicle" or "utility task vehicle" (UTV).

The user interface 20 allows the user to interact with the ATV 10. More particularly, the user interface 20 comprises an accelerator, a brake control, and the steering device 13 that are operated by the user to control motion of the ATV 10 on the ground. The user interface 20 also comprises an instrument panel (e.g., a dashboard) which provides indicators (e.g., a speedometer indicator, a tachometer indicator, etc.) to convey information to the user.

The track systems 16 engage the ground to provide traction to the ATV 10. More particularly, in this example, the front ones of the track systems 16 provide front traction to the ATV 10 while the rear ones of the track systems 16 provide rear traction to the ATV 10.

Figure 2A:
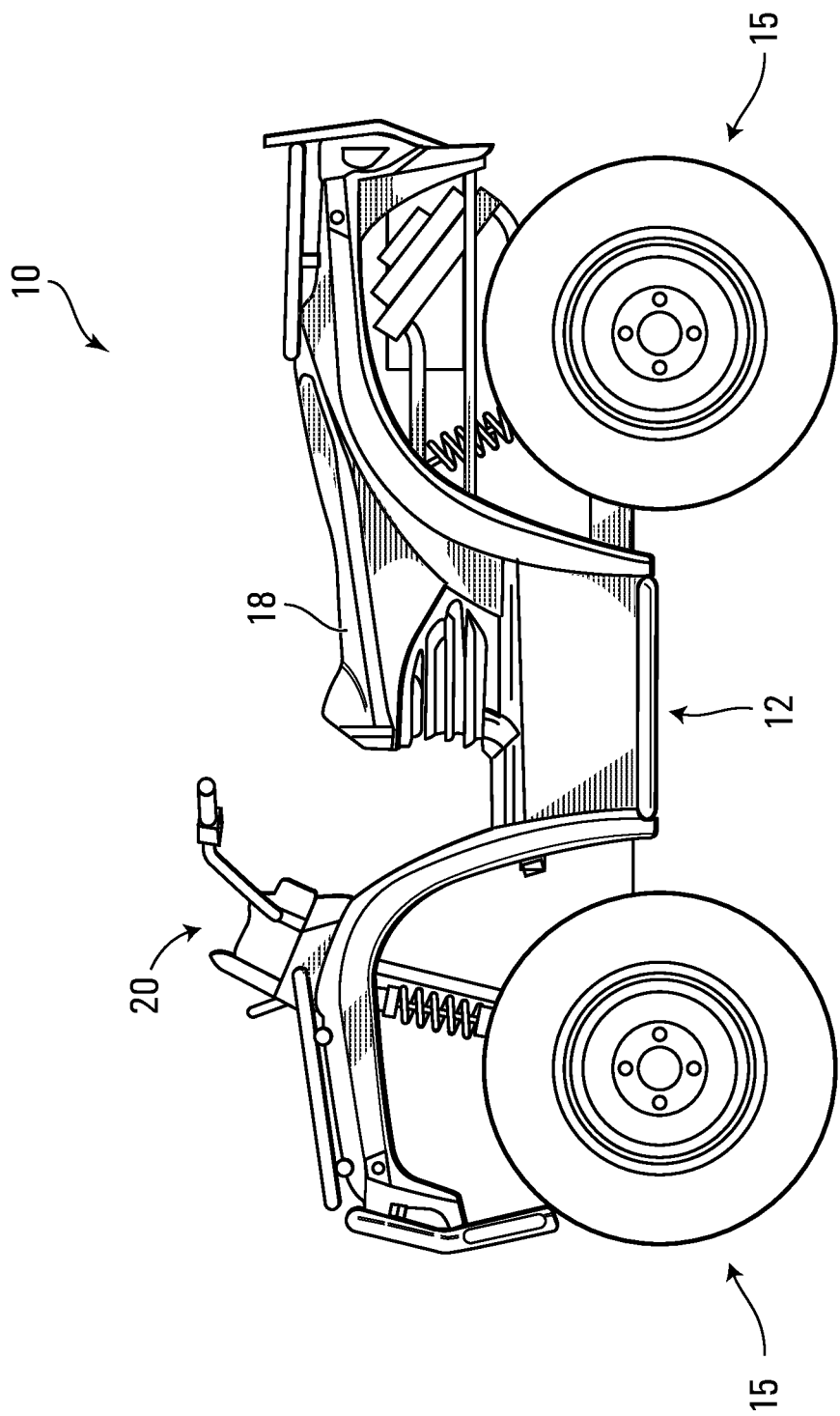
FIGS. 2A and 2B show the ATV equipped with ground-engaging wheels instead of the track systems.
Figure 2B:
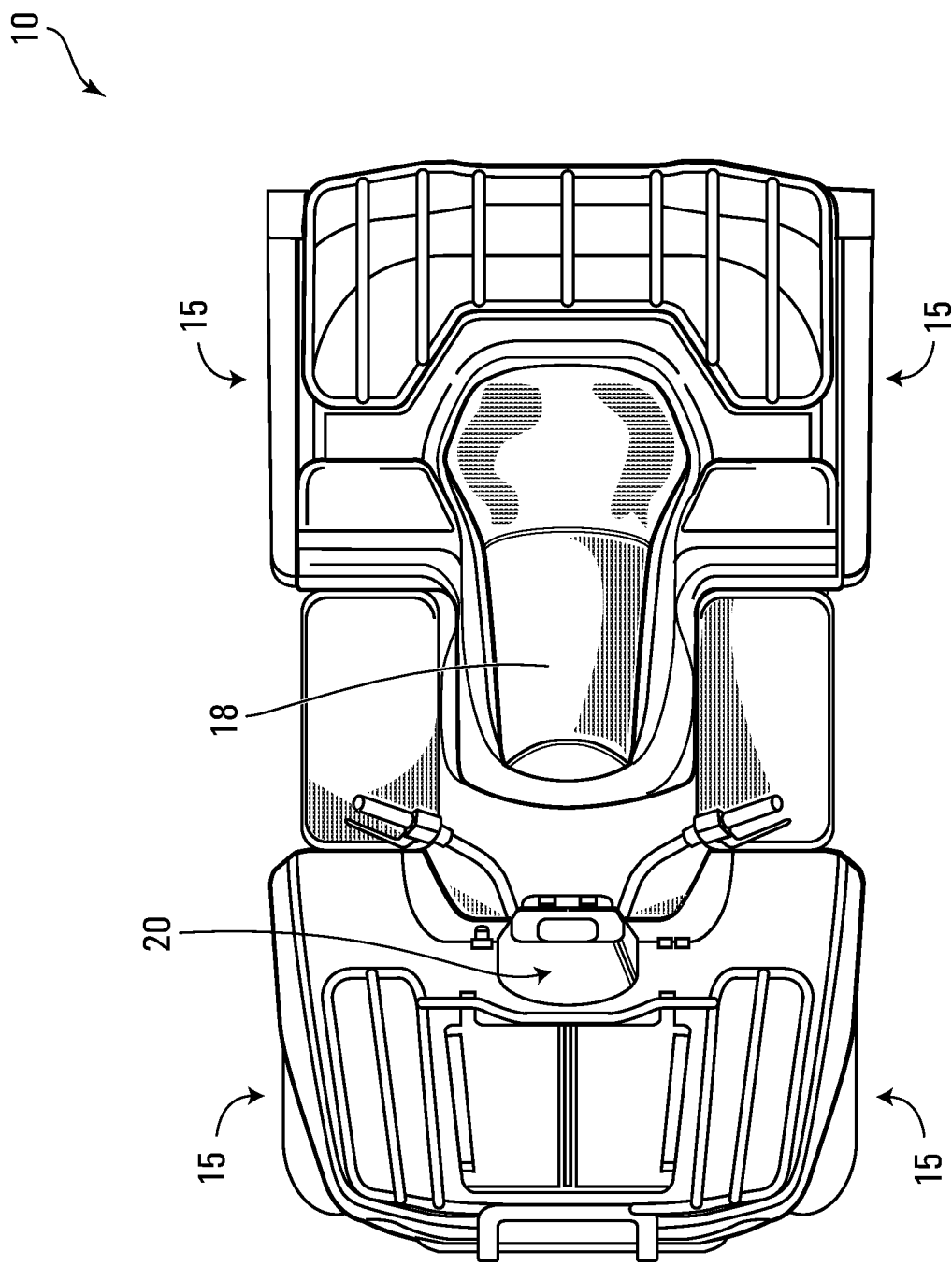
Figure 3:
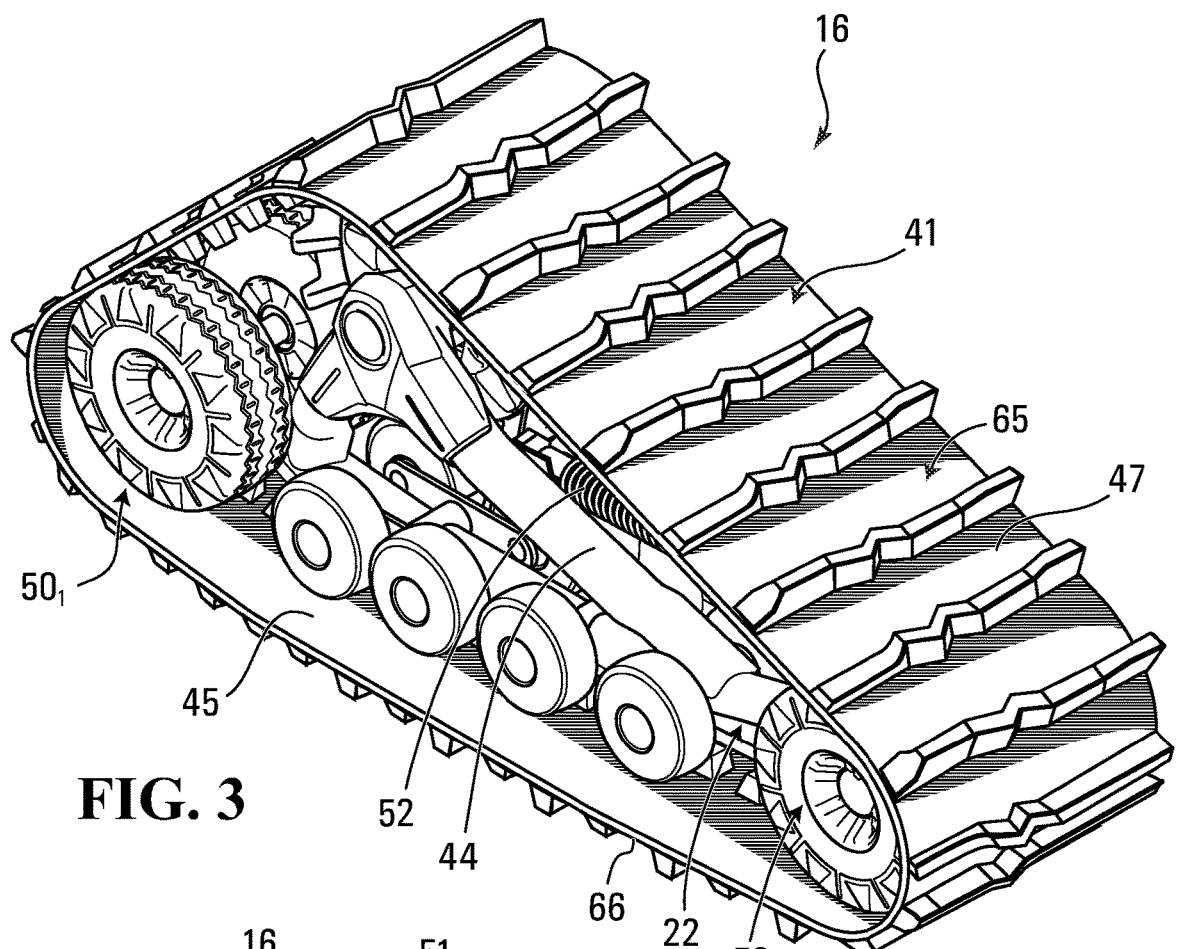
FIGS. 3 and 4 respectively show perspective and side views of a rear one of the track systems.
Figure 4:
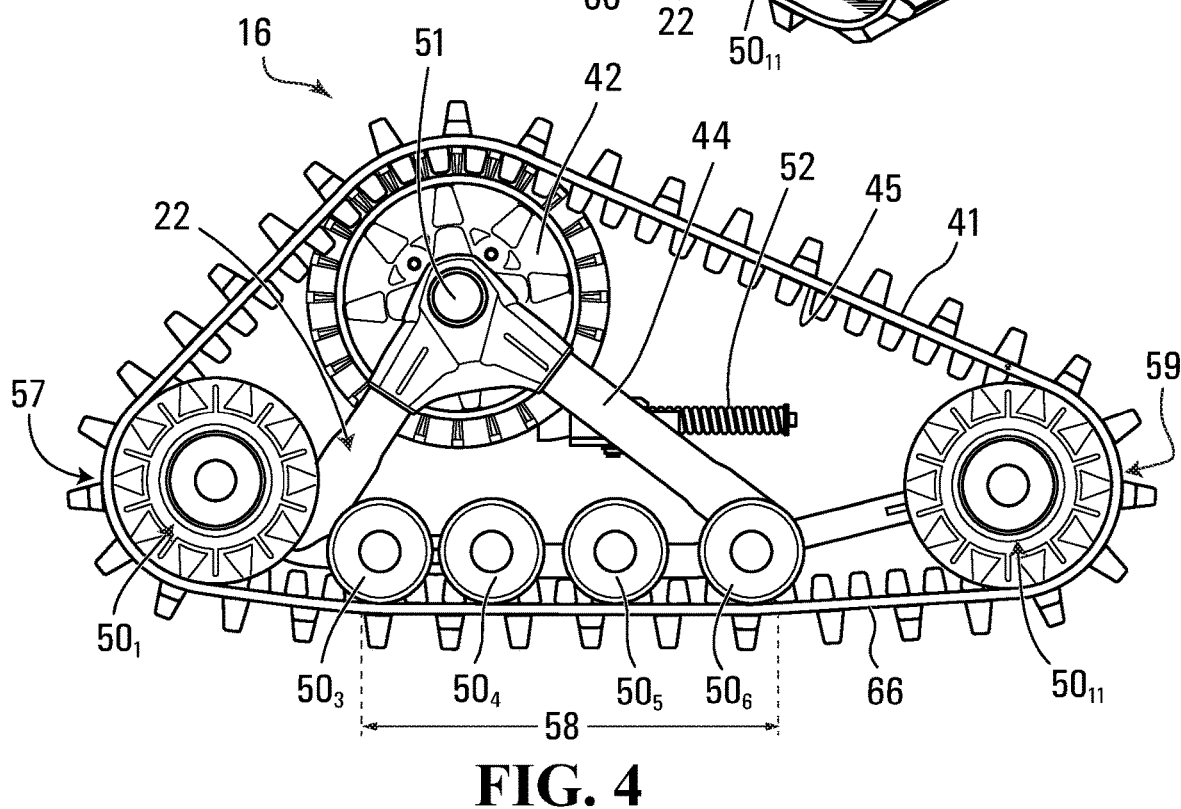
Figure 5:
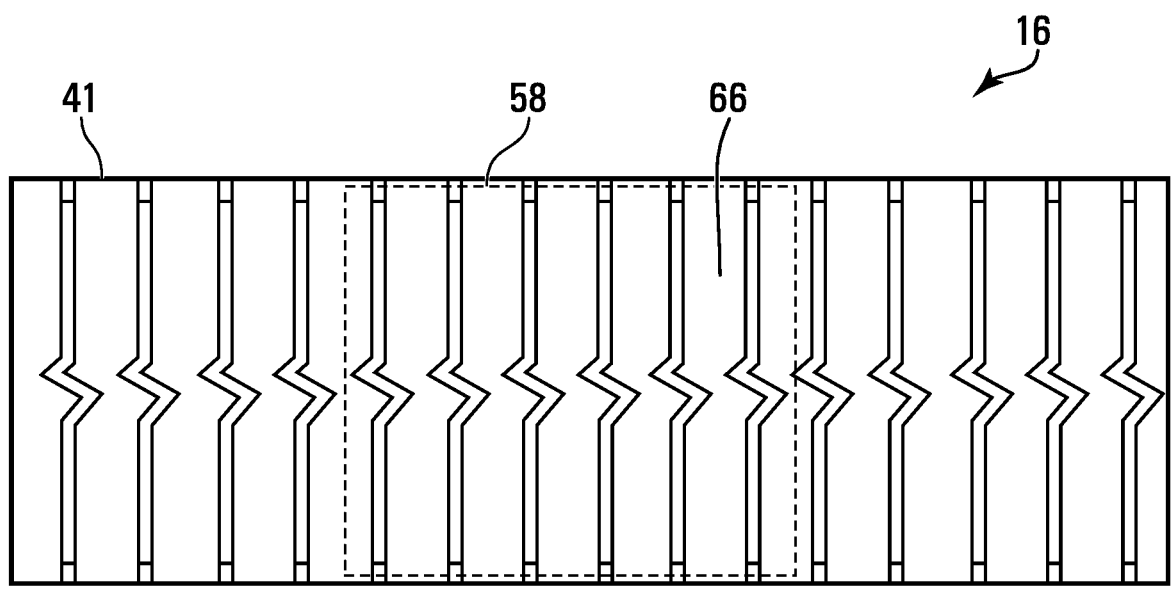
FIG. 5 shows a bottom view of the track system.
Figure 6:
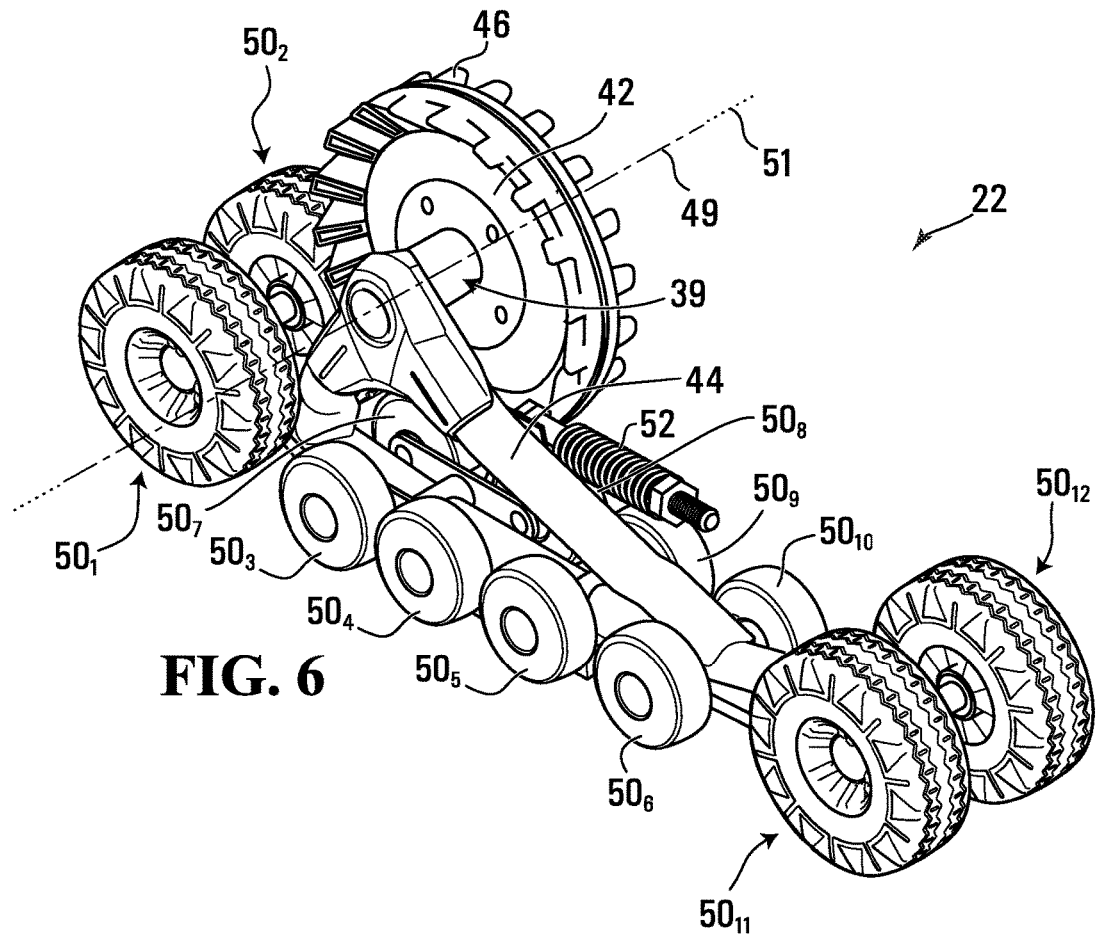
FIGS. 6 and 7 respectively show perspective and side views of the track system without its track.
Figure 7:
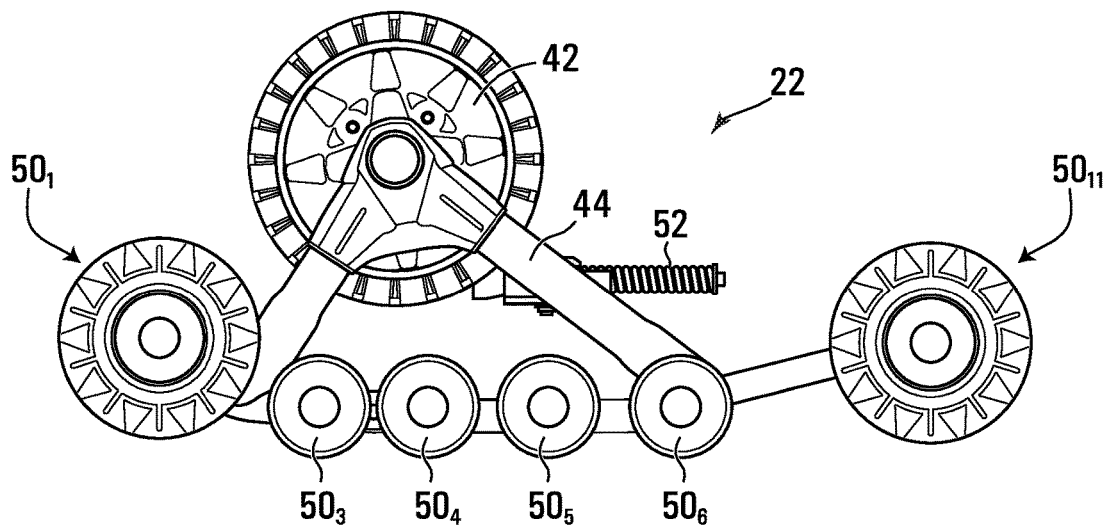

In this embodiment, each track system 16 is mounted in place of a ground-engaging wheel that may otherwise be mounted at a position of the track system 16 to propel the ATV 10 on the ground. For example, as shown in FIGS. 2A and 2B, the ATV 10 may be propelled on the ground by four ground-engaging wheels 15 having tires instead of by the track systems 16. Basically, in this embodiment, the track systems 16 may be used to convert the ATV 10 from a wheeled vehicle into a tracked vehicle, thereby enhancing its traction and floatation on the ground.

With additional reference to FIGS. 3 to 7, in this embodiment, each track system 16 comprises a track-engaging assembly 22 and a track 41 disposed around the track-engaging assembly 22. In this example, the track-engaging assembly 22 comprises a frame 44 and a plurality of track-contacting wheels which includes a drive wheel 42 and a plurality of idler wheels $50_1$-$50_{12}$. The track system 16 has a front longitudinal end 57 and a rear longitudinal end 59 that define a length of the track system 16. A width of the track system 16 is defined by a width of the track 41. An envelope of the track system 16 is defined by a length of the track 41. The track system 16 has a longitudinal direction, a widthwise direction (i.e., a lateral direction), and a height direction.

Figure 8:
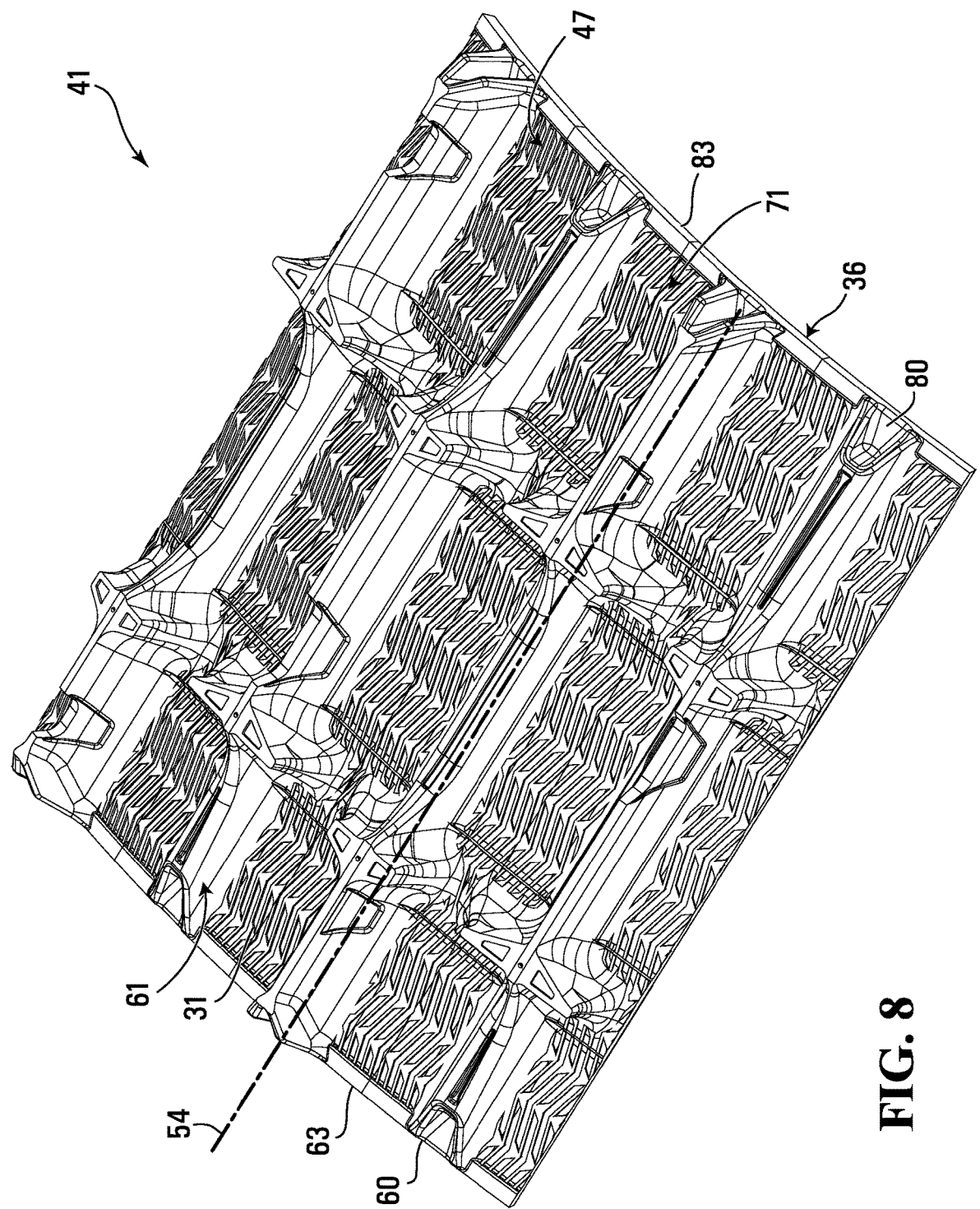
FIGS. 8 and 9 show perspective views of a segment of the track of the track system, which depict features of an inner side and a ground-engaging outer side of the track.
Figure 9:
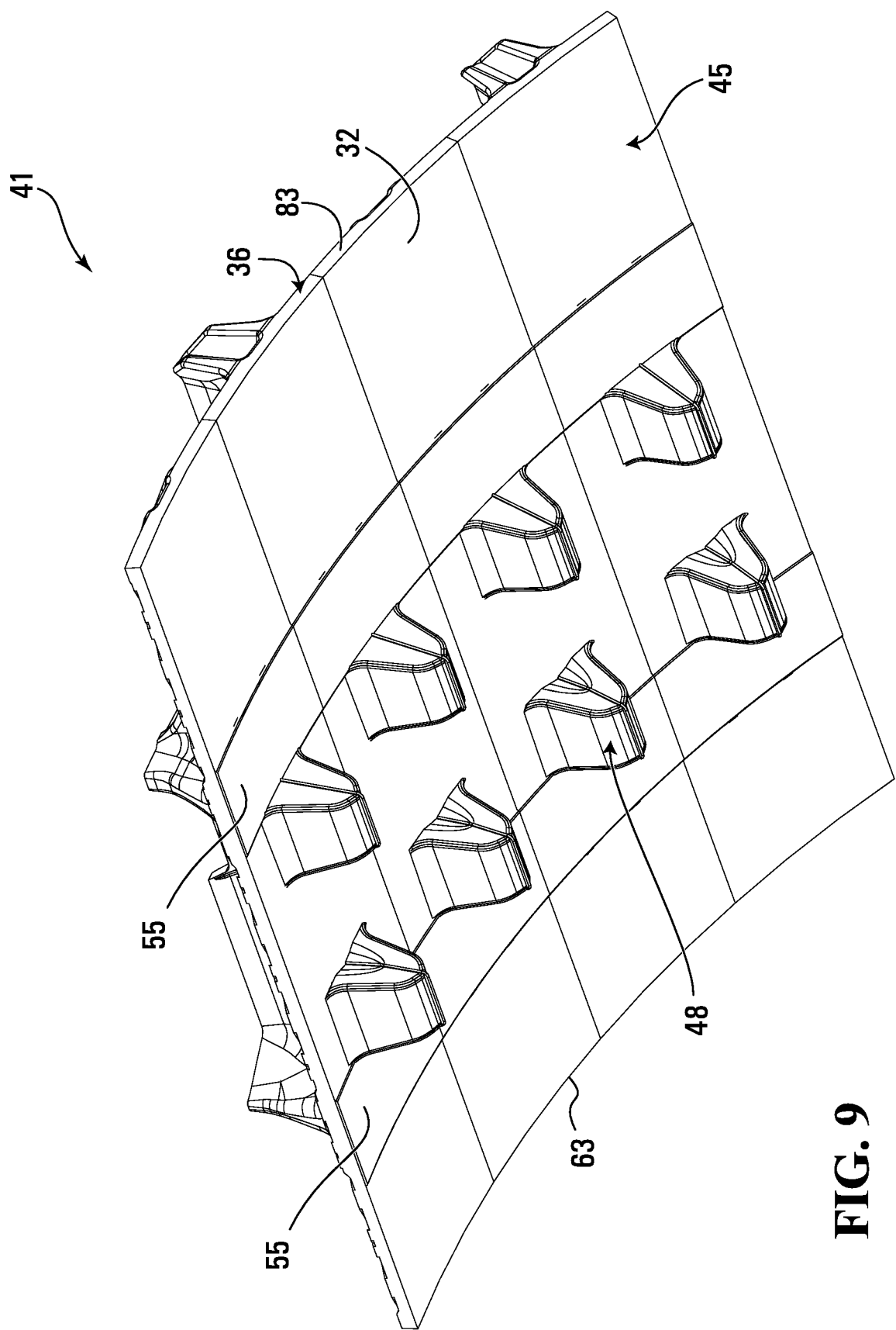
Figure 10:
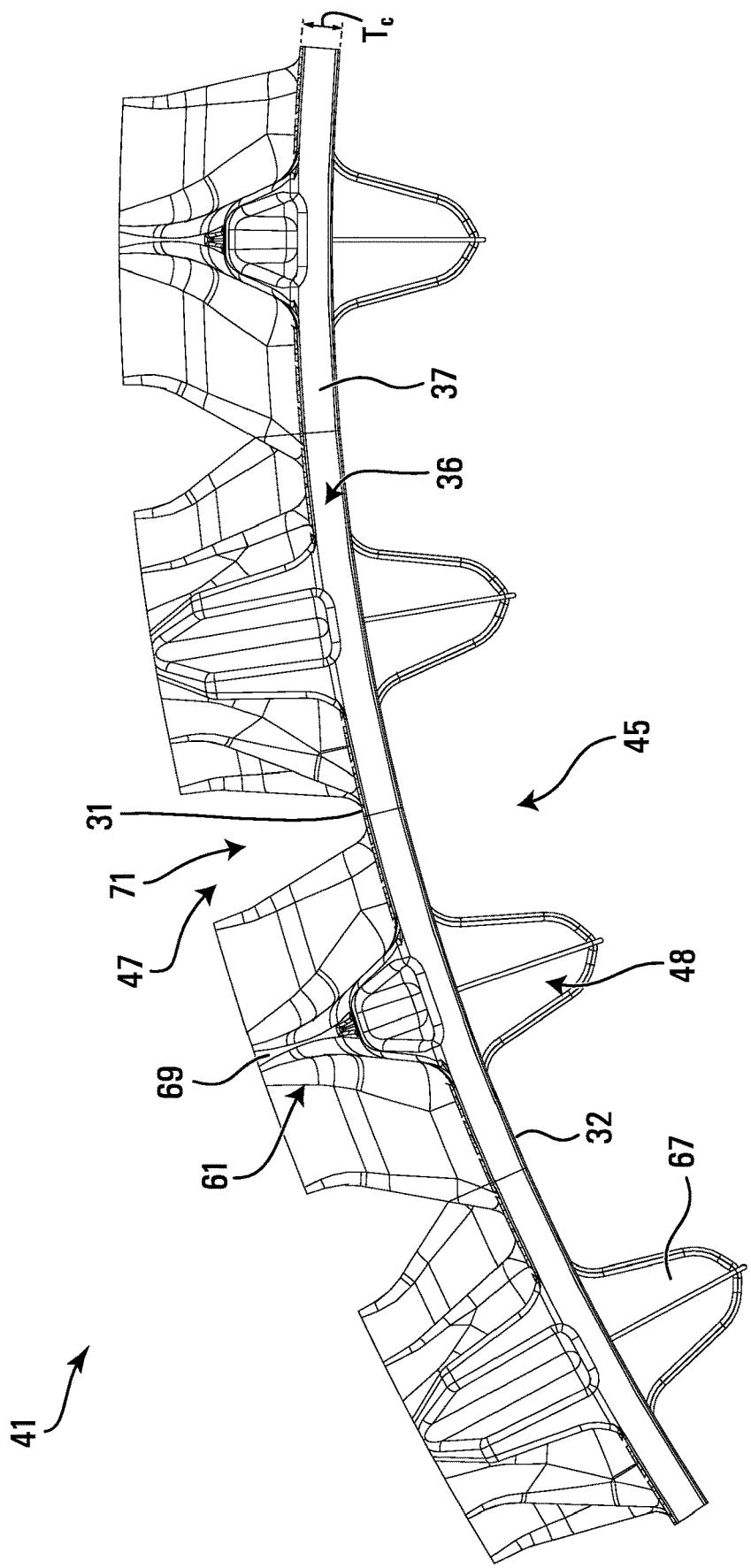
FIG. 10 shows a side view of the track of the track system.

The track 41 engages the ground to provide traction to the ATV 10. The length of the track 41 allows the track 41 to be mounted around the track-engaging assembly 22. In view of its closed configuration without ends that allows it to be disposed and moved around the track-engaging assembly 22, the track 41 can be referred to as an "endless" track. Referring additionally to FIGS. 8 to 10, the track 41 comprises an inner side 45 facing the wheels 42, $50_1$-$50_{12}$ and defining an inner area of the track 41 in which these wheels are located. The track 41 also comprises a ground-engaging outer side 47 opposite the inner side 45 for engaging the ground on which the ATV 10 travels. Lateral edges 63, 83 of the track 41 define the track's width. The track 41 has a top run 65 which extends between the longitudinal ends 57, 59 of the track system 16 and over the drive wheel 42, and a bottom run 66 which extends between the longitudinal ends 57, 59 of the track system 16 and under the idler wheels $50_1$-$50_{12}$. The bottom run 66 of the track 41 defines an area of contact 58 of the track 41 with the ground which generates traction and bears a majority of a load on the track system 16, and which will be referred to as a "contact patch" of the track 41 with the ground. The track 41 has a longitudinal direction, a widthwise direction (i.e., a lateral direction), and a thickness direction.

The track 41 is elastomeric in that it comprises elastomeric material allowing it to flex around the wheels 42, $50_1$-$50_{12}$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_{12}$.

Figure 11:
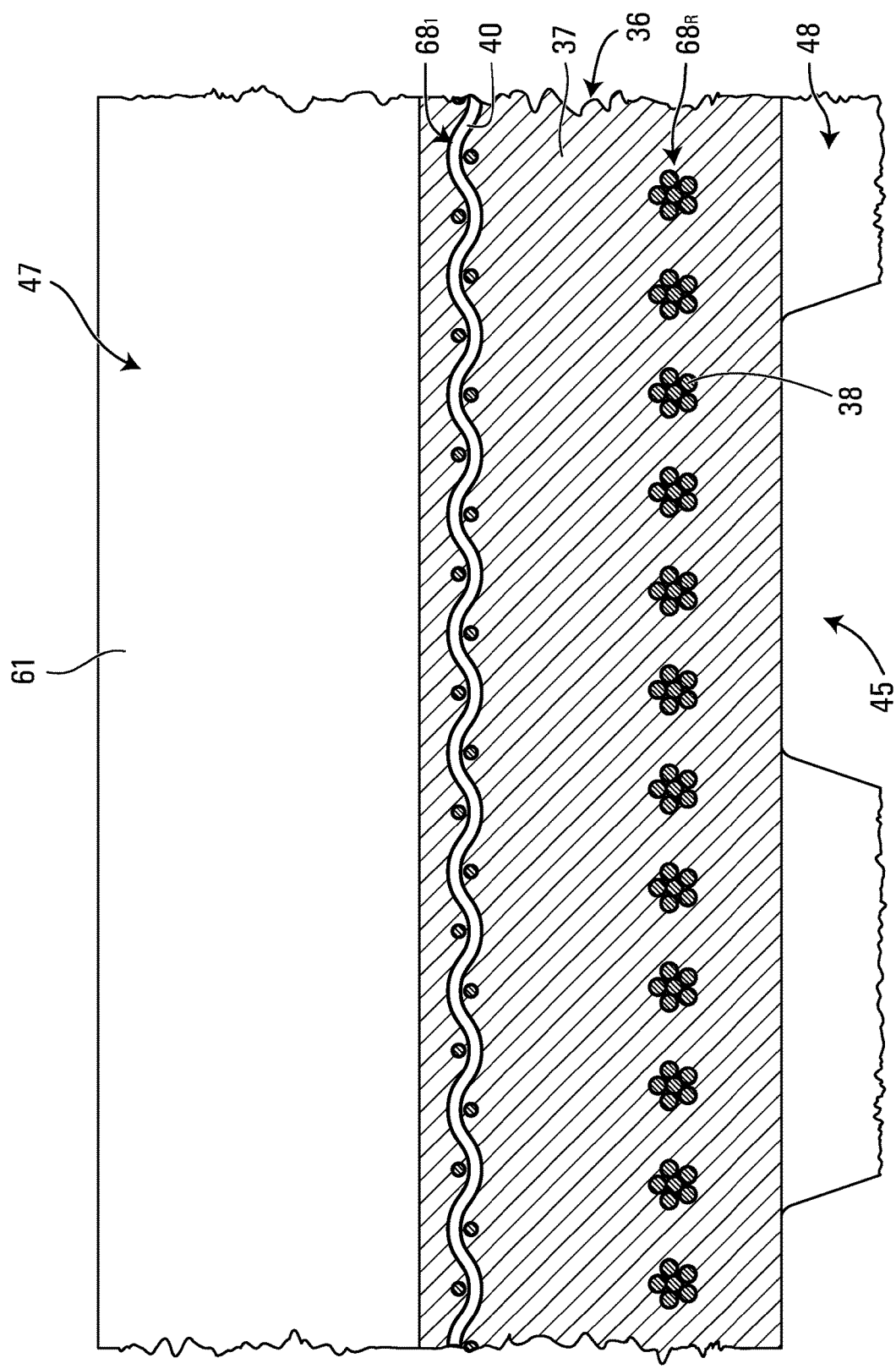
FIG. 11 shows a partial cross-sectional view of the track of the track system.

As shown in FIG. 11, in some embodiments, the carcass 36 may comprise a plurality of reinforcements $68_1$-$68_R$ (e.g., reinforcing layers) embedded in its elastomeric material 37. One example of a reinforcement $68_i$ is a layer of reinforcing cables 38 that are adjacent and generally parallel to one another. For instance, the reinforcing cables 38 may extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement $68_i$ is a layer of reinforcing fabric 40. Reinforcing fabric comprises pliable material made usually by weaving, felting, knitting, interlacing, or otherwise crossing natural or synthetic elongated fabric elements, such as fibers, filaments, strands and/or others, such that at least some of the elongated fabric elements extend transversally to the longitudinal direction of the track 41 to have a reinforcing effect transversally to the longitudinal direction of the track 41. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in some embodiments, layers of elastomeric material providing the elastomeric material 37 of the carcass 36, the reinforcing cables 38 and the layer of reinforcing fabric 40 may be placed into the mold and consolidated during molding.

In this embodiment, the inner side 45 of the track 41 comprises an inner surface 32 of the carcass 36 and a plurality of wheel-contacting projections 48 that project from the inner surface 32 to contact at least some of the wheels 42, $50_1$-$50_{10}$ and that are used to do at least one of driving (i.e., imparting motion to) the track 41 and guiding the track 41. In that sense, the wheel-contacting projections 48 can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs 48 interact with the drive wheel 42 in order to cause the track 41 to be driven, and also interact with the idler wheels $50_1$-$50_{12}$ in order to guide the track 41 as it is driven by the drive wheel 42. The drive/guide lugs 48 are thus used to both drive the track 41 and guide the track 41 in this embodiment.

The drive/guide lugs 48 are spaced apart along the longitudinal direction of the track 41. In this case, the drive/guide lugs 48 are arranged in a plurality of rows that are spaced apart along the widthwise direction of the track 41. The drive/guide lugs 48 may be arranged in other manners in other embodiments (e.g., a single row or more than two rows). Each of the drive/guide lugs 48 is an elastomeric drive/guide lug in that it comprises elastomeric material 67. The drive/guide lugs 48 can be provided and connected to the carcass 36 in the mold during the track's molding process.

The ground-engaging outer side 47 of the track 41 comprises a ground-engaging outer surface 31 of the carcass 36 and a plurality of traction projections 61 that project from the outer surface 31 and engage and may penetrate into the ground to enhance traction. The traction projections 61, which can sometimes be referred to as "traction lugs" or "traction profiles", are spaced apart in the longitudinal direction of the track system 16. The ground-engaging outer side 47 comprises a plurality of traction-projection-free areas 71 between successive ones of the traction projections 61. In this example, each of the traction projections 61 is an elastomeric traction projection in that it comprises elastomeric material 69. The traction projections 61 can be provided and connected to the carcass 36 in the mold during the track's molding process.

Each traction projection 61 extends transversally to the longitudinal direction of the track 41. That is, the traction projection 61 has a longitudinal axis 54 extending transversally to the longitudinal direction of the track 41. In this example, the longitudinal axis 54 of the traction projection 61 is substantially parallel to the widthwise direction of the track 41. In other examples, the longitudinal axis 54 of the traction projection 61 may be transversal to the longitudinal direction of the track 41 without being parallel to the widthwise direction of the track 41.

In this embodiment, the traction projection 61 extends across at least a majority of the width of the track 41. More particularly, in this example, the traction projection 61 extends across substantially an entirety of the width of the track 41. The traction projection 61 has longitudinal ends 60, 80 adjacent to respective ones of the lateral edges 63, 83 of the track 41. The traction projection 61 may extend across any suitable part of the width of the endless track 41 in other embodiments.

Also, in this embodiment, the traction projection 61 varies in cross-sectional shape along its longitudinal axis 54. That is, cross-sections of the traction projection 61 at different positions along the longitudinal axis 54 of the traction projection 61 are different.

The traction projections 61 may be configured in various other ways in other embodiments.

In this example, the carcass 36 has a thickness $T_c$ which is relatively small. The thickness $T_c$ of the carcass 36 is measured from the inner surface 32 to the ground-engaging outer surface 31 of the carcass 36 between longitudinally-adjacent ones of the traction projections 61. For example, in some embodiments, the thickness $T_c$ of the carcass 36 may be no more than 0.250 inches, in some cases no more than 0.240 inches, in some cases no more than 0.230 inches, in some cases no more than 0.220 inches, in some cases no more than 0.210 inches, in some cases no more than 0.200 inches, and in some cases even less (e.g., 0.180 or 0.170 inches). The thickness $T_c$ of the carcass 36 may have any other suitable value in other embodiments.

Figure 12:
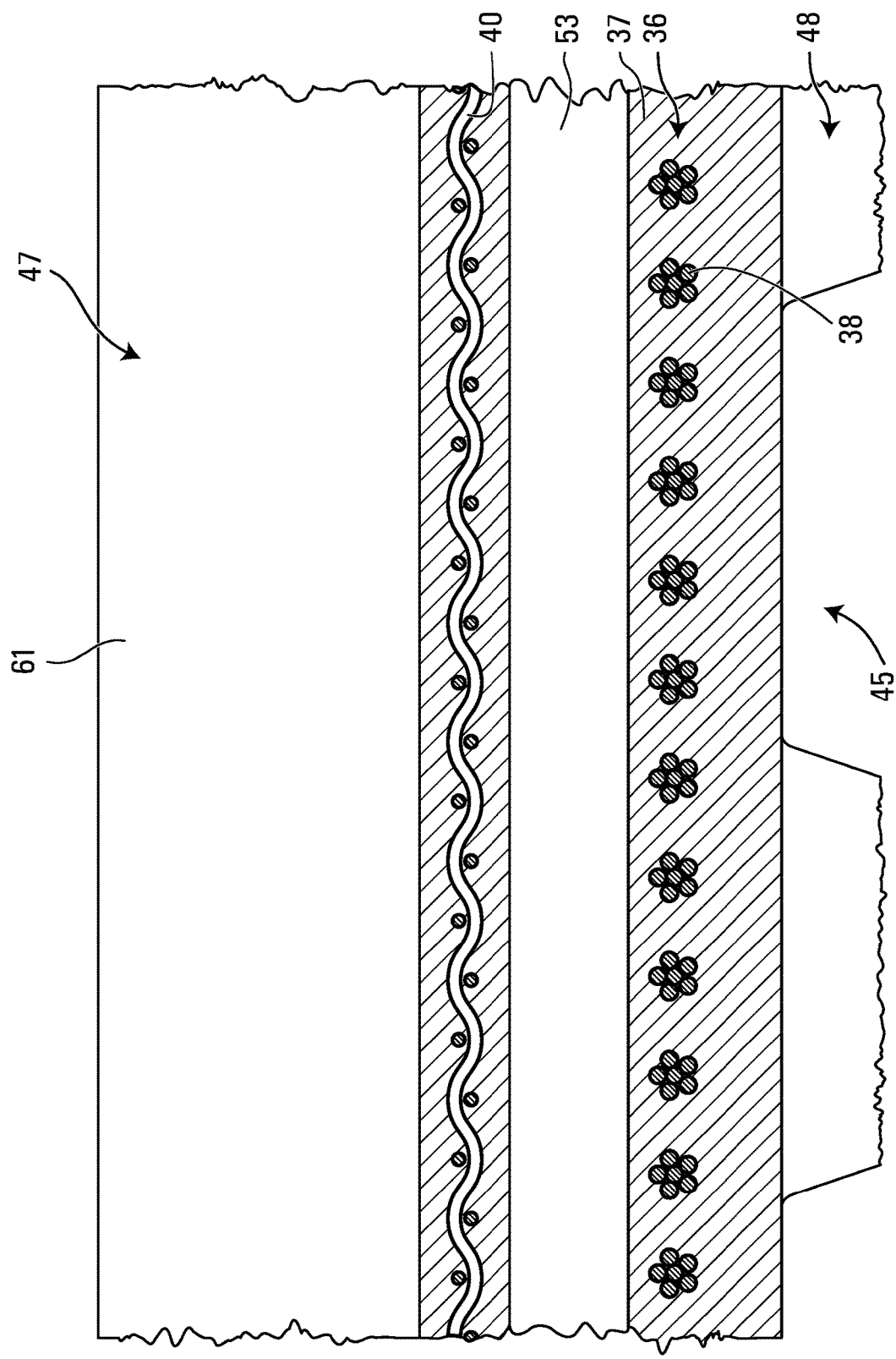
FIG. 12 shows a partial cross-sectional view of a variant of the track of the track system.

In this embodiment, as shown in FIG. 11, the track 41 is free of transversal stiffening rods embedded in its elastomeric material. That is, the track 41 does not comprise transversal stiffening rods embedded in its elastomeric material and extending transversally to its longitudinal direction. FIG. 12 shows a variant in which the track 41 may comprise transversal stiffening rods 53 embedded in its elastomeric material and extending transversally to its longitudinal direction in other embodiments. This absence of transversal stiffening rods in some embodiments, such as shown in FIG. 11, makes the track 41 more flexible in its widthwise direction than if the track 41 had the transversal stiffening rods 53 but was otherwise identical.

Figure 13:
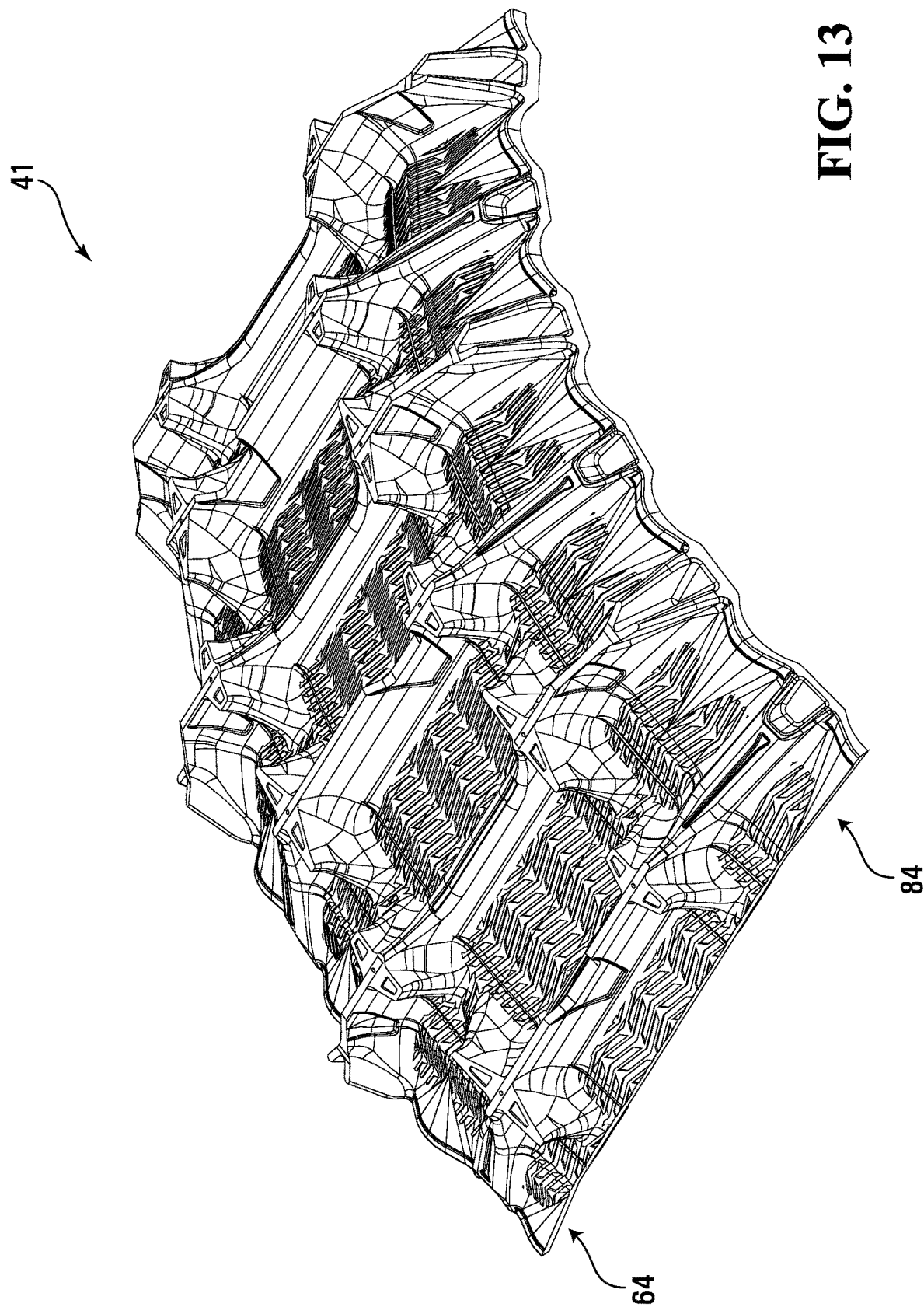
FIGS. 13 and 14 show views of a segment of the track of a front one of the track systems.
Figure 14:
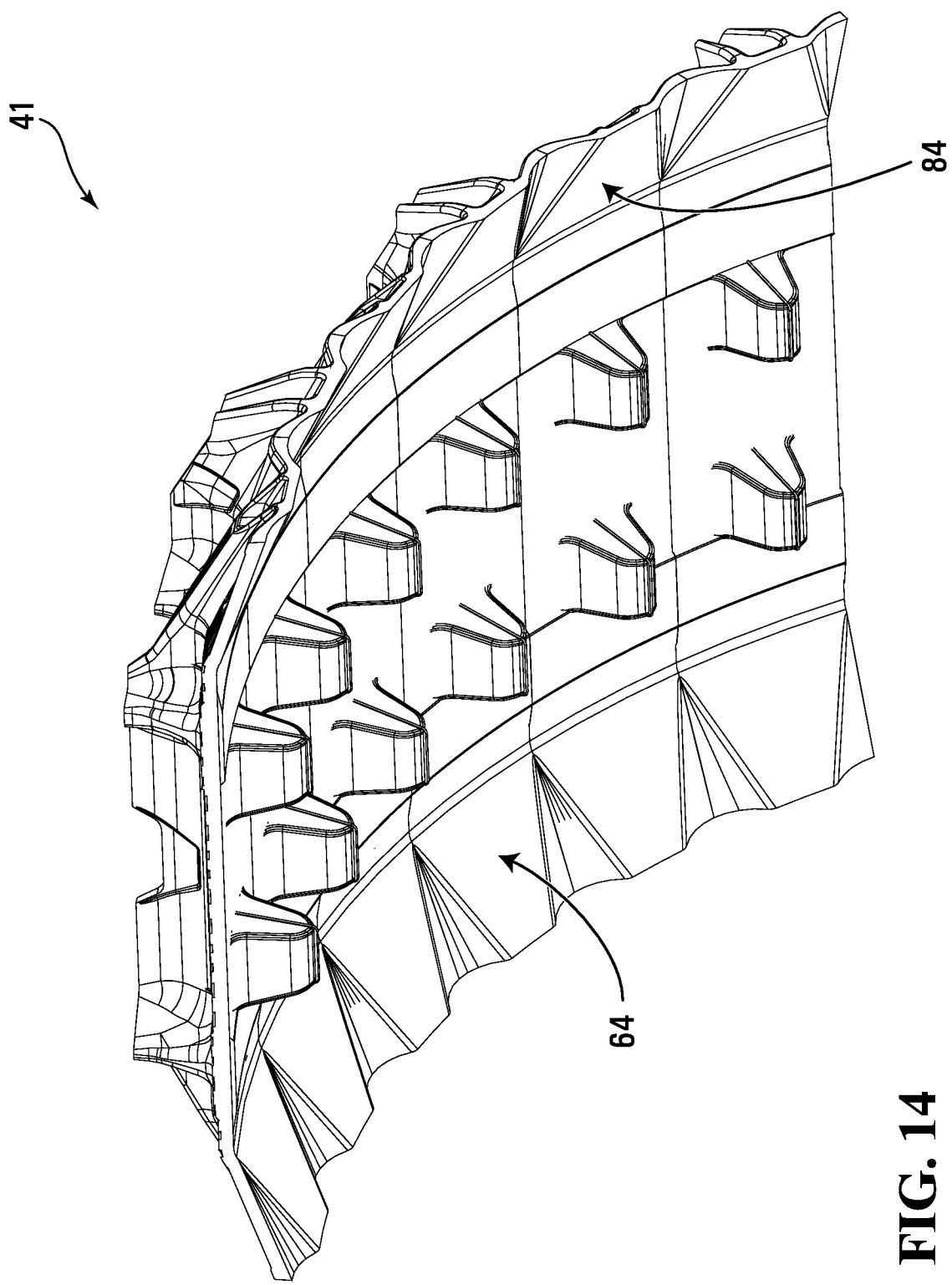

The track 41 shown in FIGS. 8 to 12 is that of a given one of the rear track assemblies 16. FIGS. 13 and 14 show the track 41 of a given one of the front track assemblies 16, which is similar to the track 41 of the given one of the rear track assemblies 16, except that it comprises bent lateral edge portions 64, 84 adjacent its lateral edges 63, 83 to facilitate steering of the given one of the front track assemblies 16 on the ground, by creating a smaller ground-contacting area. More particularly, the carcass 36 of the track 41 of the given one of the front track assemblies 16 is bent inwardly proximate the lateral edges 63, 83 of the track 41 such that its inner surface 32 and ground-engaging outer surface 31 are bent inwardly.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs 48 may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle 21 of the ATV. In this example, the axis of rotation 49 corresponds to an axis of rotation 79 of the axle 21 of the ATV 10. More particularly, in this example, the drive wheel 42 has a hub which is mounted to the axle 21 of the ATV 10 such that power generated by the prime mover 14 and delivered over the powertrain 12 of the ATV 10 rotates the axle 21, which rotates the drive wheel 42, which imparts motion of the track 41. In this embodiment in which the track system 16 is mounted where a ground-engaging wheel 15 could otherwise be mounted, the axle 21 of the ATV 10 is capable of rotating the drive wheel 42 of the track system 16 or the ground-engaging wheel 15.

In this embodiment, the drive wheel 42 comprises a drive sprocket engaging the drive/guide lugs 48 of the inner side 45 of the track 41 in order to drive the track 41. In this case, the drive sprocket 42 comprises a plurality of teeth 46 distributed circumferentially along its rim to define a plurality of lug-receiving spaces therebetween that receive the drive/guide lugs 48 of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_{12}$ are not driven by power supplied by the prime mover 14, but are rather used to do at least one of supporting part of the weight of the ATV 10 on the ground via the track 41, guiding the track 41 as it is driven by the drive wheel 42, and tensioning the track 41. More particularly, in this embodiment, the idler wheels $50_1$, $50_2$ and the idler wheels $50_{11}$, $50_{12}$ are respectively front idler wheels (leading idler wheels) and rear idler wheels (trailing idler wheels) that maintain the track 41 in tension, and can help to support part of the weight of the ATV 10 on the ground via the track 41. The idler wheels $50_3$-$50_{10}$ are roller wheels that roll on the inner side 45 of the track 41 along the bottom run 66 of the track 41 to apply the bottom run 66 on the ground. The idler wheels $50_1$-$50_{12}$ move on respective ones of a plurality of idler wheel paths 55 of the inner surface 32 of the carcass 36 of the track 41. Each of the idler wheel paths 55 extends adjacent to respective ones of the drive/guide lugs 48 to allow these lugs to guide motion of the track 41. As the roller wheels $50_3$-$50_{10}$ roll on respective ones of the idler wheel paths 55, these paths can be referred to as "rolling paths".

The idler wheels $50_1$-$50_{12}$ may be arranged in other configurations and/or the track system 16 may comprise more or less idler wheels in other embodiments.

The frame 44 supports components of the track system 16, including the idler wheels $50_1$-$50_{12}$. More particularly, in this embodiment, the front idler wheels $50_1$, $50_2$ are mounted to the frame 44 in a front longitudinal end region of the frame 44 proximate the front longitudinal end 57 of the track system 16, while the rear idler wheels $50_{11}$, $50_{12}$ are mounted to the frame 44 in a rear longitudinal end region of the frame 44 proximate the rear longitudinal end 59 of the track system 16. The roller wheels $50_3$-$50_{10}$ are mounted to the frame 44 in a central region of the frame 44 between the front idler wheels $50_1$, $50_2$ and the rear idler wheels $50_{11}$, $50_{12}$. Each of the roller wheels $50_3$-$50_{10}$ may be rotatably mounted directly to the frame 44 or may be rotatably mounted to a link which is pivotally mounted to the frame 44 to which is rotatably mounted an adjacent one of the roller wheels $50_3$-$50_{10}$, thus forming a "tandem".

The frame 44 is supported at a support area 39. More specifically, in this case, the frame 44 is supported by the axle 21 of the ATV 10 to which is coupled the drive wheel 42, such that the support area 39 is intersected by the axis of rotation 49 of the drive wheel 42.

In this embodiment, the frame 44 is pivotable about a pivot axis 51 to facilitate motion of the track system 16 on uneven terrain and enhance its traction on the ground. More particularly, in this embodiment, the pivot axis 51 corresponds to the axis of rotation 49 of the drive wheel 42 and the frame 44 can pivot about the axle of the ATV 10 to which the drive wheel 42 is coupled. In other embodiments, the pivot axis 51 of the frame 44 may be located elsewhere (e.g., lower) than the axis of rotation 49 of the drive wheel 42. In yet other embodiments, the frame 44 may not be pivotable.

Also, in this embodiment, the track system 16 comprises an anti-rotation connector 52 to limit a pivoting movement of the track system 16 relative to the frame 11 of the ATV 10. In this example, the anti-rotation connector 52 comprises a spring and a damper and is connected between the frame 44 of the track system 16 and the frame 11 of the ATV 10 (e.g., via one or more mounting brackets and/or fasteners).

The rigidity characteristics of the track 41 may be designed to enhance traction, floatation, and/or other aspects of performance of the track system 16. For example, in some embodiments, the rigidity characteristics of the track 41 may provide better load distribution, reduce power consumption, and/or enhance other aspects of performance of the track system 16. For instance, the rigidity characteristics of the track 41 may relate to (1) a longitudinal rigidity of the track 41, i.e., a rigidity of the track 41 in its longitudinal direction which refers to the track's resistance to bending about an axis parallel to its widthwise direction, and/or (2) a widthwise rigidity of the track 41, i.e., a rigidity of the track 41 in its widthwise direction which refers to the track's resistance to bending about an axis parallel to its longitudinal direction.

For example, in some embodiments, the widthwise rigidity of the track 41 may be such that, although it may be flexible in its widthwise direction (e.g., due to its elastomeric nature), the track 41 can be sufficiently rigid in its widthwise direction to properly distribute loading on the track 41 for floatation and traction (e.g., by tending to avoid a situation in which most of the loading on the track 41 is distributed only under and near the idler wheels $50_3$-$50_{10}$ with little or no loading being distributed on parts of the track 41 between the idler wheels $50_3$-$50_{10}$ and the track's lateral edges 63, 83).

As another example, in some embodiments, the longitudinal rigidity of the track 41 may be such that, although it can flex in its longitudinal direction to move around the track-engaging assembly 22 (e.g., to reduce power consumed to bend it as it turns about the leading and trailing idler wheels $50_1$, $50_2$, $50_{11}$, $50_{12}$ and the drive wheel 24), the track 41 can be sufficiently rigid in its longitudinal direction to help maintain a generally straight shape of the bottom run 66 of the track 41 for proper traction.

Accordingly, in some embodiments, as shown in FIGS. 15A and 15B, the widthwise rigidity of the track 41 when subject to loading tending to laterally bend the track 41 inwardly (i.e., bend the track 41 about an axis parallel to its longitudinal direction such that points $P_1$, $P_2$ of the track 41 on opposing sides of that axis move in an inward direction oriented from its ground-engaging outer side 47 towards its inner side 45 as shown in FIG. 15A) may be substantially identical to (i.e., substantially the same as) or different from (i.e., substantially greater or lower than) the widthwise rigidity of the track 41 when subject to loading tending to laterally bend the track 41 outwardly (i.e., bend the track 41 about an axis parallel to its longitudinal direction such that points $P_1$, $P_2$ of the track 41 on opposing sides of that axis move in an outward direction oriented from its inner side 45 towards its ground-engaging outer side 47).

Figure 16A:
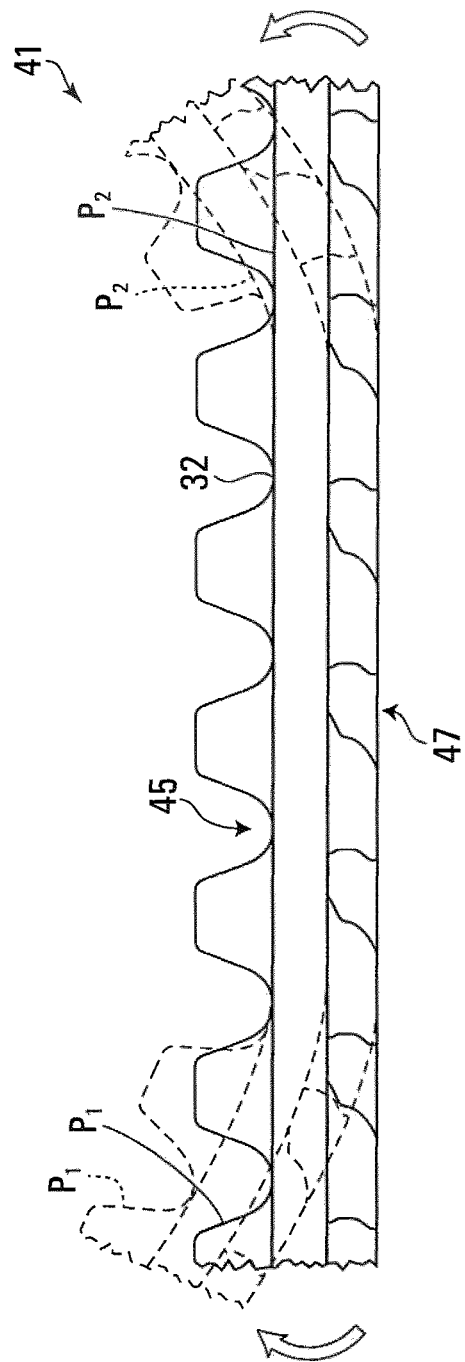
FIGS. 16A and 16B respectively show a cross-sectional view of the track taken along a longitudinal direction of the track when the track is subjected to loading tending to longitudinally bend the track inwardly and outwardly.
Figure 16B:
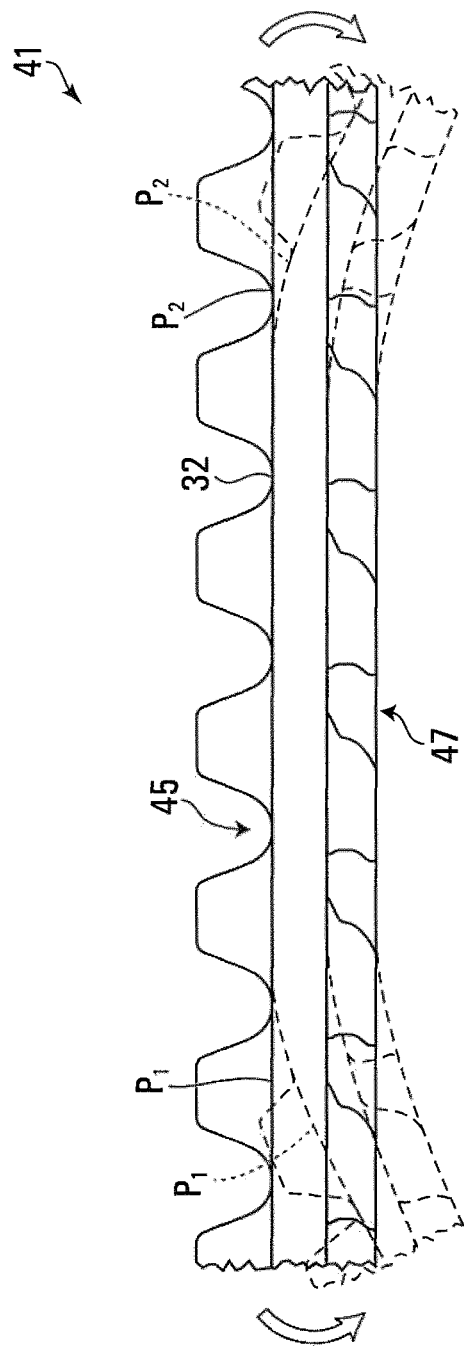

Also, in some embodiments, as shown in FIGS. 16A and 16B, the longitudinal rigidity of the track 41 when subject to loading tending to longitudinally bend the track 41 inwardly (i.e., bend the track 41 about an axis parallel to its widthwise direction such that points $P_1$, $P_2$ of the track 41 on opposing sides of that axis move in an inward direction oriented from its ground-engaging outer side 47 towards its inner side 45 as shown in FIG. 16A) may be substantially identical to (i.e., substantially the same as) or different from (i.e., substantially greater or lower than) the longitudinal rigidity of the track 41 when subject to loading tending to longitudinally bend the track 41 outwardly (i.e., bend the track 41 about an axis parallel to its widthwise direction such that points $P_1$, $P_2$ of the track 41 on opposing sides of that axis move in an outward direction oriented from its inner side 45 towards its ground-engaging outer side 47).

Figure 17:
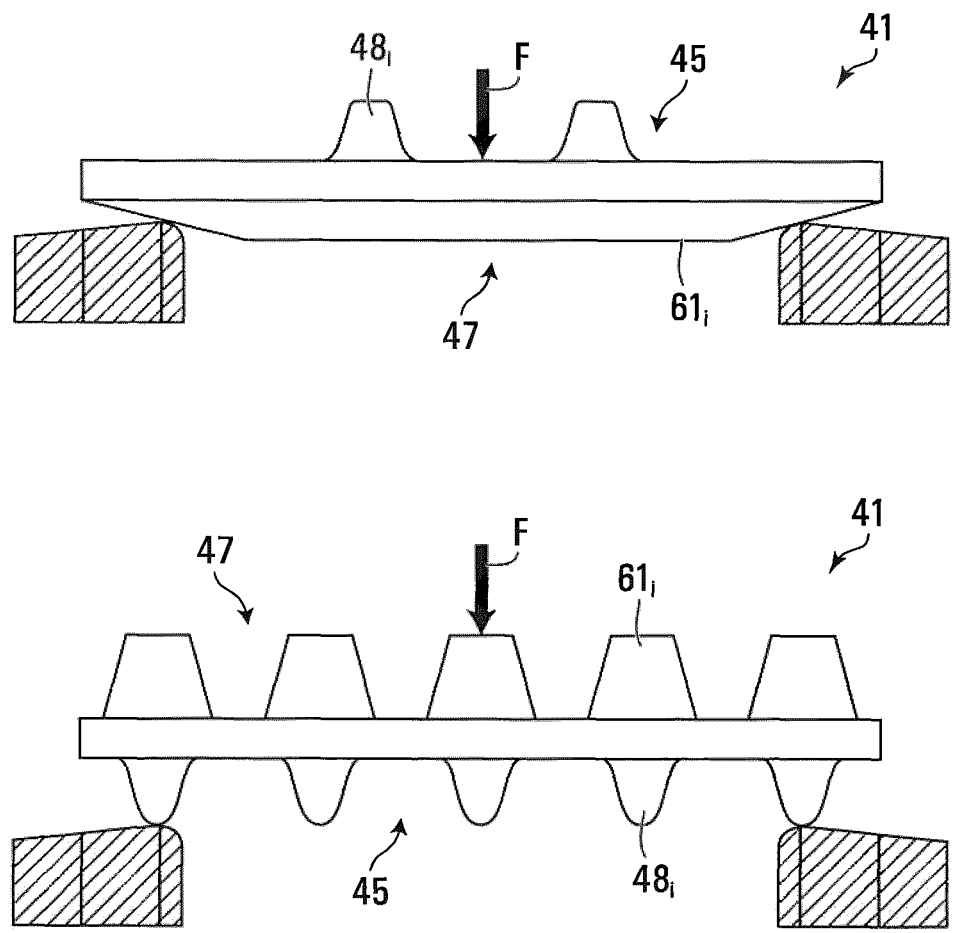
FIG. 17 shows a three-point bending test being performed on a sample of the track to determine a widthwise rigidity of the track or a longitudinal rigidity of the track.

To observe the widthwise rigidity and the longitudinal rigidity of the track 41, as shown in FIG. 17, a three-point bending test can be performed on a sample of the track 41 to subject the track 41 to loading tending to bend the track 41 in specified ways (i.e., bend the track 41 laterally to observe the widthwise rigidity of the track 41 and bend the track 41 longitudinally to observe the longitudinal rigidity of the track 41) and measure parameters indicative of the widthwise rigidity and the longitudinal rigidity of the track 41. For instance, in some embodiments, the three-point bending test may be based on conditions defined in a standard test (e.g., ISO 178(2010) but using elastomeric material). For example:

To observe the widthwise rigidity of the track 41 when subject to loading tending to laterally bend the track 41 inwardly, the three-point bending test may be performed to subject the track 41 to loading tending to laterally bend the track 41 inwardly until a predetermined deflection of the track 41 is reached and measure a bending load at that predetermined deflection of the track 41. The predetermined deflection of the track 41 may be selected such as to correspond to a predetermined strain of the track 41 at a specified point of the track 41 (e.g., a point of the inner surface 32 of the carcass 36, such as a midpoint of the sample where the bending load is applied). For instance, in some embodiments, the predetermined strain of the track 41 may between 3% and 5%. The bending load at the predetermined deflection of the track 41 may be used to calculate a bending stress at the specified point of the track 41. The bending stress at the specified point of the track 41 may be calculated as $\sigma=My/I$, where M is the moment about a neutral axis of the track 41 in this bending action caused by the bending load, y is the perpendicular distance from the specified point of the track 41 to the neutral axis of the track 41, and I is the second moment of area about the neutral axis of the track 41. Based on the conditions of the standard test (e.g., ISO 178(2010) but using elastomeric material), the bending stress at the specified point of the track 41 may be calculated using an equation which depends on the bending load and dimensions of the sample. The widthwise rigidity of the track 41 when subject to loading tending to laterally bend the track 41 inwardly can be taken as the bending stress at the predetermined strain (i.e., at the predetermined deflection) of the track 41. Alternatively, the widthwise rigidity of the track 41 when subject to loading tending to laterally bend the track 41 inwardly may be taken as the bending load at the predetermined deflection of the track 41;

To observe the widthwise rigidity of the track 41 when subject to loading tending to laterally bend the track 41 outwardly, the three-point bending test may be performed to subject the track 41 to loading tending to laterally bend the track 41 outwardly until a predetermined deflection of the track 41 is reached and measure a bending load at that predetermined deflection of the track 41. The predetermined deflection of the track 41 may be selected such as to correspond to a predetermined strain of the track 41 at a specified point of the track 41 (e.g., a point of the outer surface 31 of the carcass 36, such as a midpoint of the sample where the bending load is applied). For instance, in some embodiments, the predetermined strain of the track 41 may between 3% and 5%. The bending load at the predetermined deflection of the track 41 may be used to calculate a bending stress at the specified point of the track 41. The bending stress at the specified point of the track 41 may be calculated as $\sigma=My/I$, where M is the moment about a neutral axis of the track 41 in this bending action caused by the bending load, y is the perpendicular distance from the specified point of the track 41 to the neutral axis of the track 41, and I is the second moment of area about the neutral axis of the track 41. Based on the conditions of the standard test (e.g., ISO 178(2010) but using elastomeric material), the bending stress at the specified point of the track 41 may be calculated using an equation which depends on the bending load and dimensions of the sample. The widthwise rigidity of the track 41 when subject to loading tending to laterally bend the track 41 outwardly can be taken as the bending stress at the predetermined strain (i.e., at the predetermined deflection) of the track 41. Alternatively, the widthwise rigidity of the track 41 when subject to loading tending to laterally bend the track 41 outwardly may be taken as the bending load at the predetermined deflection of the track 41;

To observe the longitudinal rigidity of the track 41 when subject to loading tending to longitudinally bend the track 41 inwardly, the three-point bending test may be performed to subject the track 41 to loading tending to longitudinally bend the track 41 inwardly until a predetermined deflection of the track 41 is reached and measure a bending load at that predetermined deflection of the track 41. The predetermined deflection of the track 41 may be selected such as to correspond to a predetermined strain of the track 41 at a specified point of the track 41 (e.g., a point of the inner surface 32 of the carcass 36, such as a midpoint of the sample where the bending load is applied). For instance, in some embodiments, the predetermined strain of the track 41 may between 3% and 5%. The bending load at the predetermined deflection of the track 41 may be used to calculate a bending stress at the specified point of the track 41. The bending stress at the specified point of the track 41 may be calculated as $\sigma = My/I$, where M is the moment about a neutral axis of the track 41 in this bending action caused by the bending load, y is the perpendicular distance from the specified point of the track 41 to the neutral axis of the track 41, and I is the second moment of area about the neutral axis of the track 41. Based on the conditions of the standard test (e.g., ISO 178(2010) but using elastomeric material), the bending stress at the specified point of the track 41 may be calculated using an equation which depends on the bending load and dimensions of the sample. The longitudinal rigidity of the track 41 when subject to loading tending to longitudinally bend the track 41 inwardly can be taken as the bending stress at the predetermined strain (i.e., at the predetermined deflection) of the track 41. Alternatively, the longitudinal rigidity of the track 41 when subject to loading tending to longitudinally bend the track 41 inwardly may be taken as the bending load at the predetermined deflection of the track 41;

To observe the longitudinal rigidity of the track 41 when subject to loading tending to longitudinally bend the track 41 outwardly, the three-point bending test may be performed to subject the track 41 to loading tending to longitudinally bend the track 41 outwardly until a predetermined deflection of the track 41 is reached and measure a bending load at that predetermined deflection of the track 41. The predetermined deflection of the track 41 may be selected such as to correspond to a predetermined strain of the track 41 at a specified point of the track 41 (e.g., a point of the outer surface 31 of the carcass 36, such as a midpoint of the sample where the bending load is applied). For instance, in some embodiments, the predetermined strain of the track 41 may between 3% and 5%. The bending load at the predetermined deflection of the track 41 may be used to calculate a bending stress at the specified point of the track 41. The bending stress at the specified point of the track 41 may be calculated as $\sigma = My/I$, where M is the moment about a neutral axis of the track 41 in this bending action caused by the bending load, y is the perpendicular distance from the specified point of the track 41 to the neutral axis of the track 41, and I is the second moment of area about the neutral axis of the track 41. Based on the conditions of the standard test (e.g., ISO 178(2010) but using elastomeric material), the bending stress at the specified point of the track 41 may be calculated using an equation which depends on the bending load and dimensions of the sample. The longitudinal rigidity of the track 41 when subject to loading tending to longitudinally bend the track 41 outwardly can be taken as the bending stress at the predetermined strain (i.e., at the predetermined deflection) of the track 41. Alternatively, the longitudinal rigidity of the track 41 when subject to loading tending to longitudinally bend the track 41 outwardly may be taken as the bending load at the predetermined deflection of the track 41.

A lateral bending stiffness of the track 41 can be deemed to be "symmetric" (i.e., the track 41 may be substantially as stiff when subject to loading tending to laterally bend it inwardly than when subject to loading tending to laterally bend it outwardly) if the widthwise rigidity of the track 41 when subject to loading tending to laterally bend it inwardly and the widthwise rigidity of the track 41 when subject to loading tending to laterally bend it outwardly are substantially identical, i.e., a ratio of these widthwise rigidities (with a higher one of them as numerator, if they slightly differ) is no more than 1.05, in some cases no more than 1.03, in some cases no more than 1.01, and in some cases 1.

Conversely, the lateral bending stiffness of the track 41 can be deemed to be "asymmetric" (i.e., the track 41 may be significantly stiffer when subject to loading tending to laterally bend it inwardly than when subject to loading tending to laterally bend it outwardly, or vice versa) if the widthwise rigidity of the track 41 when subject to loading tending to laterally bend the track 41 inwardly and the widthwise rigidity of the track 41 when subject to loading tending to laterally bend the track 41 outwardly are substantially different, i.e., a ratio of these widthwise rigidities (with a higher one of them as numerator) is greater than 1.05, in some cases at least 1.1, in some cases at least 1.2, in some cases at least 1.3, in some cases at least 1.5, in some cases at least 2, and in some cases even more.

In a similar manner, a longitudinal bending stiffness of the track 41 can be deemed to be "symmetric" (i.e., the track 41 may be substantially as stiff when subject to loading tending to longitudinally bend it inwardly than when subject to loading tending to longitudinally bend it outwardly) if the longitudinal rigidity of the track 41 when subject to loading tending to longitudinally bend it inwardly and the longitudinal rigidity of the track 41 when subject to loading tending to longitudinally bend it outwardly are substantially identical, i.e., a ratio of these widthwise rigidities (with a higher one of them as numerator, if they slightly differ) is no more than 1.05, in some cases no more than 1.03, in some cases no more than 1.01, and in some cases 1.

The longitudinal bending stiffness of the track 41 can be deemed to be "asymmetric" (i.e., the track 41 may be significantly stiffer when subject to loading tending to longitudinally bend it inwardly than when subject to loading tending to longitudinally bend it outwardly, or vice versa) if the longitudinal rigidity of the track 41 when subject to loading tending to longitudinally bend the track 41 inwardly and the longitudinal rigidity of the track 41 when subject to loading tending to longitudinally bend the track 41 outwardly are substantially different, i.e., a ratio of these longitudinal rigidities (with a higher one of them as numerator) is greater than 1.05, in some cases at least 1.1, in some cases at least 1.2, in some cases at least 1.3, in some cases at least 1.5, in some cases at least 2, and in some cases even more.

The rigidity characteristics of the track 41 depend on rigidity characteristics of the carcass 36, including (1) a longitudinal rigidity of the carcass 36, i.e., a rigidity of the carcass 36 in the track's longitudinal direction which refers to the carcass's resistance to bending about an axis parallel to the track's widthwise direction, and (2) a widthwise rigidity of the carcass 36, i.e., a rigidity of the carcass 36 in the track's widthwise direction which refers to the carcass's resistance to bending about an axis parallel to the track's longitudinal direction.

Figure 18A:
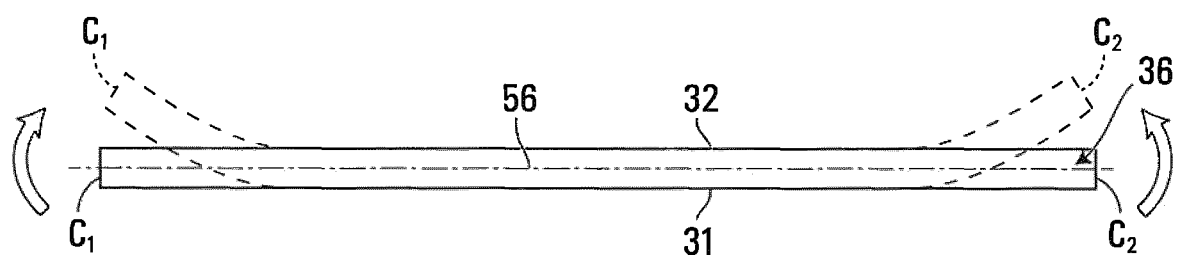
FIGS. 18A and 18B respectively show a cross-sectional view of a carcass of the track taken along the widthwise direction of the track when the carcass is subjected to loading tending to laterally bend the carcass inwardly and outwardly.
Figure 18B:
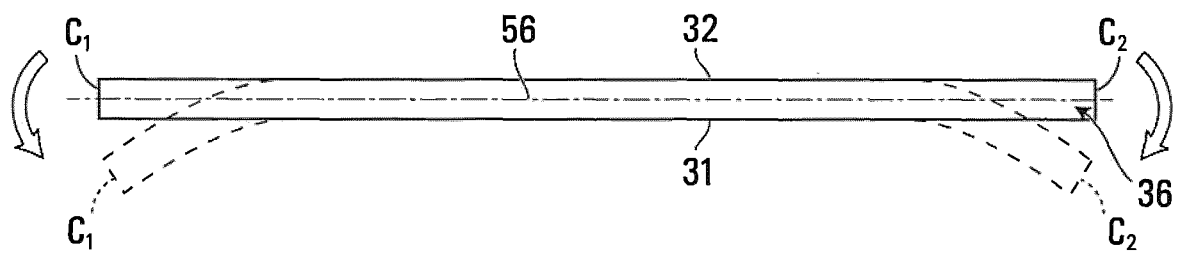

Thus, in some embodiments, as shown in FIGS. 18A and 18B, the widthwise rigidity of the carcass 36 when subject to loading tending to laterally bend the carcass 36 inwardly (i.e., bend the carcass 36 about an axis parallel to the longitudinal direction of the track 41 such that points $C_1$, $C_2$ of the carcass 36 on opposing sides of that axis move in an inward direction oriented from the ground-engaging outer side 47 of the track 41 towards the inner side 45 of the track 41 as shown in FIG. 18A) may be substantially identical to (i.e., substantially the same as) or different from (i.e., substantially greater or lower than) the widthwise rigidity of the carcass 36 when subject to loading tending to laterally bend the carcass 36 outwardly (i.e., bend the carcass 36 about an axis parallel to the longitudinal direction of the track 41 such that points $C_1$, $C_2$ of the carcass 36 on opposing sides of that axis move in an outward direction oriented from the inner side 45 of the track 41 towards the ground-engaging outer side 47 of the track 41 as shown in FIG. 18B). A neutral axis 56 of the carcass 36, which may be referred to as a "lateral-bending neutral axis", can be defined when the carcass 36 is subject to loading tending to laterally bend it inwardly or outwardly.

Figure 19A:
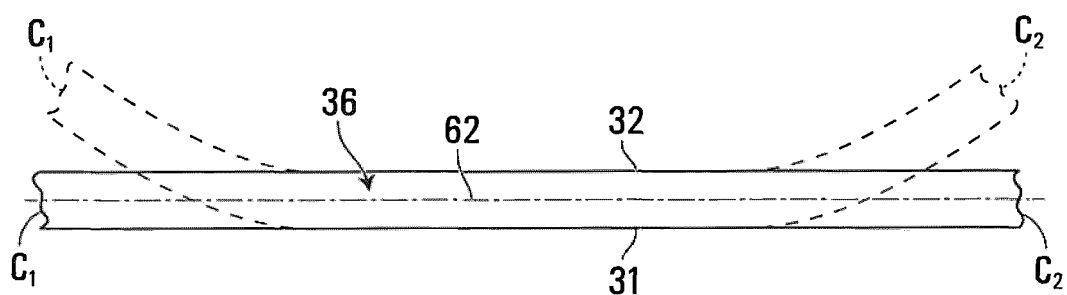
FIGS. 19A and 19B respectively show a cross-sectional view of the carcass of the track taken along the longitudinal direction of the track when the carcass is subjected to loading tending to longitudinally bend the carcass inwardly and outwardly.
Figure 19B:
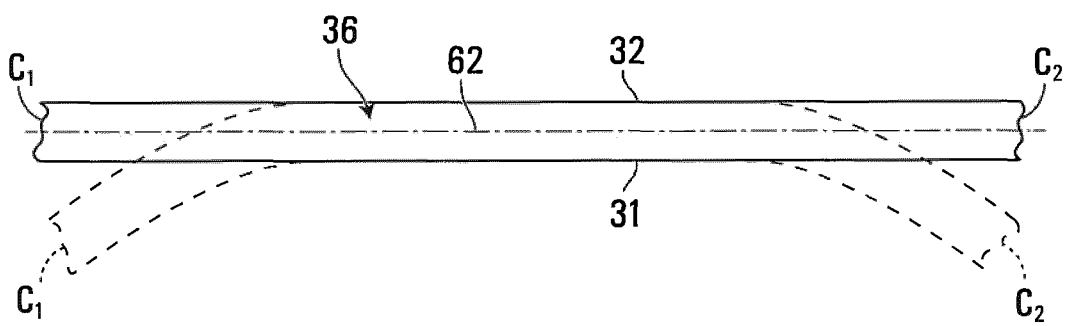

Also, in some embodiments, as shown in FIGS. 19A and 19B, the longitudinal rigidity of the carcass 36 when subject to loading tending to longitudinally bend the carcass 36 inwardly (i.e., bend the carcass 36 about an axis parallel to the widthwise direction of the track 41 such that points $C_1$, $C_2$ of the carcass 36 on opposing sides of that axis move in an inward direction oriented from the ground-engaging outer side 47 of the track 41 towards the inner side 45 of the track as shown in FIG. 19A) may be substantially identical to (i.e., substantially the same as) or different from (i.e., substantially greater or lower than) the longitudinal rigidity of the carcass 36 when subject to loading tending to longitudinally bend the carcass 36 outwardly (i.e., bend the carcass 36 about an axis parallel to the widthwise direction of the track 41 such that points $C_1$, $C_2$ of the carcass 36 on opposing sides of that axis move in an outward direction oriented from the inner side 45 of the track 41 towards the ground-engaging outer side 47 of the track 41 as shown in FIG. 19B). A neutral axis 62 of the carcass 36, which may be referred to as a "longitudinal-bending neutral axis", can be defined when the carcass 36 is subject to loading tending to longitudinally bend it inwardly or outwardly.

Figure 20:
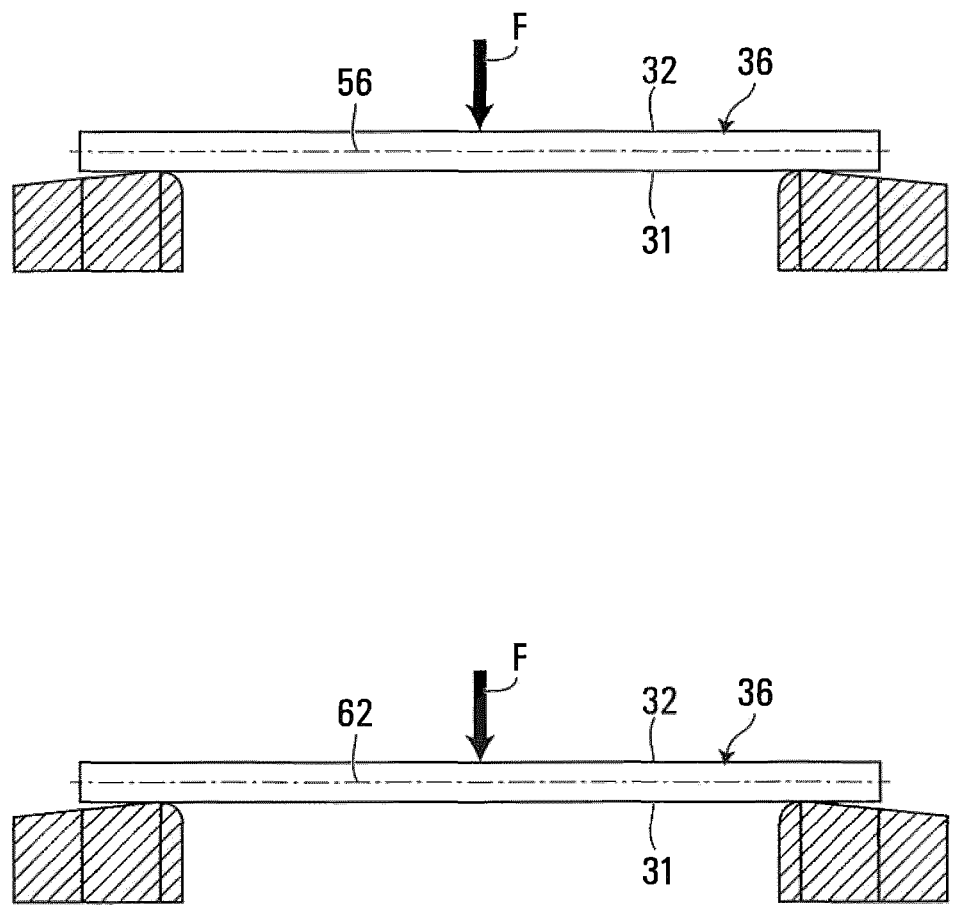
FIG. 20 shows a three-point bending test being performed on a sample of the carcass of the track to determine a widthwise rigidity of the carcass or a longitudinal rigidity of the carcass.

To observe the widthwise rigidity and the longitudinal rigidity of the carcass 36 without influence from the remainder of the track 41, as shown in FIG. 20, the carcass 36 can be isolated from the remainder of the track 41 (e.g., by scraping, cutting, or otherwise removing the traction projections 61 and the drive/guide lugs 48, or by producing the carcass 36 without the traction projections 61 and the drive/guide lugs 48) and a three-point bending test can be performed on a sample of the carcass 36 to subject the carcass 36 to loading tending to bend the carcass 36 in specified ways (i.e., bend the carcass 36 laterally to observe the widthwise rigidity of the carcass 36 and bend the carcass 36 longitudinally to observe the longitudinal rigidity of the carcass 36) and measure parameters indicative of the widthwise rigidity and the longitudinal rigidity of the carcass 36. For instance in some embodiments, the three-point bending test may be based on conditions defined in a standard test (e.g., ISO 178(2010) but using elastomeric material). For example:

To observe the widthwise rigidity of the carcass 36 when subject to loading tending to laterally bend the carcass 36 inwardly, the three-point bending test may be performed to subject the carcass 36 to loading tending to laterally bend the carcass 36 inwardly until a predetermined deflection of the carcass 36 is reached and measure a bending load at that predetermined deflection of the carcass 36. The predetermined deflection of the carcass 36 may be selected such as to correspond to a predetermined strain of the carcass 36 at a specified point of the carcass 36 (e.g., a point of the inner surface 32 of the carcass 36. such as a midpoint of the sample where the bending load is applied). For instance, in some embodiments, the predetermined strain of the carcass 36 may between 3% and 5%. The bending load at the predetermined deflection of the carcass 36 may be used to calculate a bending stress at the specified point of the carcass 36. The bending stress at the specified point of the carcass 36 may be calculated as $\sigma = My/I$, where M is the moment about the lateral-bending neutral axis 56 of the carcass 36 caused by the bending load, y is the perpendicular distance from the specified point of the carcass 36 to the lateral-bending neutral axis 56 of the carcass 36, and I is the second moment of area about the lateral-bending neutral axis 56 of the carcass 36. Based on the conditions of the standard test (e.g., ISO 178(2010) but using elastomeric material), the bending stress at the specified point of the carcass 36 may be calculated using an equation which depends on the bending load and dimensions of the sample. The widthwise rigidity of the carcass 36 when subject to loading tending to laterally bend the carcass 36 inwardly can be taken as the bending stress at the predetermined strain (i.e., at the predetermined deflection) of the carcass 36. Alternatively, the widthwise rigidity of the carcass 36 when subject to loading tending to laterally bend the carcass 36 inwardly may be taken as the bending load at the predetermined deflection of the carcass 36;

To observe the widthwise rigidity of the carcass 36 when subject to loading tending to laterally bend the carcass 36 outwardly, the three-point bending test may be performed to subject the carcass 36 to loading tending to laterally bend the carcass 36 outwardly until a predetermined deflection of the carcass 36 is reached and measure a bending load at that predetermined deflection of the carcass 36. The predetermined deflection of the carcass 36 may be selected such as to correspond to a predetermined strain of the carcass 36 at a specified point of the carcass 36 (e.g., a point of the outer surface 31 of the carcass 36, such as a midpoint of the sample where the bending load is applied). For instance, in some embodiments, the predetermined strain of the carcass 36 may between 3% and 5%. The bending load at the predetermined deflection of the carcass 36 may be used to calculate a bending stress at the specified point of the carcass 36. The bending stress at the specified point of the carcass 36 may be calculated as $\sigma = My/I$, where M is the moment about the lateral-bending neutral axis 56 of the carcass 36 caused by the bending load, y is the perpendicular distance from the specified point of the carcass 36 to the lateral-bending neutral axis 56 of the carcass 36, and I is the second moment of area about the lateral-bending neutral axis 56 of the carcass 36. Based on the conditions of the standard test (e.g., ISO 178(2010) but using elastomeric material), the bending stress at the specified point of the carcass 36 may be calculated using an equation which depends on the bending load and dimensions of the sample. The widthwise rigidity of the carcass 36 when subject to loading tending to laterally bend the carcass 36 outwardly can be taken as the bending stress at the predetermined strain (i.e., at the predetermined deflection) of the carcass 36. Alternatively, the widthwise rigidity of the carcass 36 when subject to loading tending to laterally bend the carcass 36 outwardly may be taken as the bending load at the predetermined deflection of the carcass 36;

To observe the longitudinal rigidity of the carcass 36 when subject to loading tending to longitudinally bend the carcass 36 inwardly, the three-point bending test may be performed to subject the carcass 36 to loading tending to longitudinally bend the carcass 36 inwardly until a predetermined deflection of the carcass 36 is reached and measure a bending load at that predetermined deflection of the carcass 36. The predetermined deflection of the carcass 36 may be selected such as to correspond to a predetermined strain of the carcass 36 at a specified point of the carcass 36 (e.g., a point of the inner surface 32 of the carcass 36, such as a midpoint of the sample where the bending load is applied). For instance, in some embodiments, the predetermined strain of the carcass 36 may between 3% and 5%. The bending load at the predetermined deflection of the carcass 36 may be used to calculate a bending stress at the specified point of the carcass 36. The bending stress at the specified point of the carcass 36 may be calculated as $\sigma=My/I$, where M is the moment about the longitudinal-bending neutral axis 62 of the carcass 36 caused by the bending load, y is the perpendicular distance from the specified point of the carcass 36 to the longitudinal-bending neutral axis 62 of the carcass 36, and I is the second moment of area about the longitudinal-bending neutral axis 62 of the carcass 36. Based on the conditions of the standard test (e.g., ISO 178 (2010) but using elastomeric material), the bending stress at the specified point of the carcass 36 may be calculated using an equation which depends on the bending load and dimensions of the sample. The longitudinal rigidity of the carcass 36 when subject to loading tending to longitudinally bend the carcass 36 inwardly can be taken as the bending stress at the predetermined strain (i.e., at the predetermined deflection) of the carcass 36. Alternatively, the longitudinal rigidity of the carcass 36 when subject to loading tending to longitudinally bend the carcass 36 inwardly may be taken as the bending load at the predetermined deflection of the carcass 36;

To observe the longitudinal rigidity of the carcass 36 when subject to loading tending to longitudinally bend the carcass 36 outwardly, the three-point bending test may be performed to subject the carcass 36 to loading tending to longitudinally bend the carcass 36 outwardly until a predetermined deflection of the carcass 36 is reached and measure a bending load at that predetermined deflection of the carcass 36. The predetermined deflection of the carcass 36 may be selected such as to correspond to a predetermined strain of the carcass 36 at a specified point of the carcass 36 (e.g., a point of the outer surface 31 of the carcass 36, such as a midpoint of the sample where the bending load is applied). For instance, in some embodiments, the predetermined strain of the carcass 36 may between 3% and 5%. The bending load at the predetermined deflection of the carcass 36 may be used to calculate a bending stress at the specified point of the carcass 36. The bending stress at the specified point of the carcass 36 may be calculated as $\sigma=My/I$, where M is the moment about the longitudinal-bending neutral axis 62 of the carcass 36 caused by the bending load, y is the perpendicular distance from the specified point of the carcass 36 to the longitudinal-bending neutral axis 62 of the carcass 36, and I is the second moment of area about the longitudinal-bending neutral axis 62 of the carcass 36. Based on the conditions of the standard test (e.g., ISO 178 (2010) but using elastomeric material), the bending stress at the specified point of the carcass 36 may be calculated using an equation which depends on the bending load and dimensions of the sample. The longitudinal rigidity of the carcass 36 when subject to loading tending to longitudinally bend the carcass 36 outwardly can be taken as the bending stress at the predetermined strain (i.e., at the predetermined deflection) of the carcass 36. Alternatively, the longitudinal rigidity of the carcass 36 when subject to loading tending to longitudinally bend the carcass 36 outwardly may be taken as the bending load at the predetermined deflection of the carcass 36.

A lateral bending stiffness of the carcass 36 can be deemed to be "symmetric" (i.e., the carcass 36 may be substantially as stiff when subject to loading tending to laterally bend it inwardly than when subject to loading tending to laterally bend it outwardly) if the widthwise rigidity of the carcass 36 when subject to loading tending to laterally bend it inwardly and the widthwise rigidity of the carcass 36 when subject to loading tending to laterally bend it outwardly are substantially identical, i.e., a ratio of these widthwise rigidities (with a higher one of them as numerator, if they slightly differ) is no more than 1.05, in some cases no more than 1.03, in some cases no more than 1.01, and in some cases 1.

Conversely, the lateral bending stiffness of the carcass 36 can be deemed to be "asymmetric" (i.e., the carcass 36 may be significantly stiffer when subject to loading tending to laterally bend it inwardly than when subject to loading tending to laterally bend it outwardly, or vice versa) if the widthwise rigidity of the carcass 36 when subject to loading tending to laterally bend the carcass 36 inwardly and the widthwise rigidity of the carcass 36 when subject to loading tending to laterally bend the carcass 36 outwardly are substantially different, i.e., a ratio of these widthwise rigidities (with a higher one of them as numerator) is greater than 1.05, in some cases at least 1.1, in some cases at least 1.2, in some cases at least 1.3, in some cases at least 1.5, in some cases at least 2, and in some cases even more.

In a similar manner, a longitudinal bending stiffness of the carcass 36 can be deemed to be "symmetric" (i.e., the carcass 36 may be substantially as stiff when subject to loading tending to longitudinally bend it inwardly than when subject to loading tending to longitudinally bend it outwardly) if the longitudinal rigidity of the carcass 36 when subject to loading tending to longitudinally bend it inwardly and the longitudinal rigidity of the carcass 36 when subject to loading tending to longitudinally bend it outwardly are substantially identical, i.e., a ratio of these widthwise rigidities (with a higher one of them as numerator, if they slightly differ) is no more than 1.05, in some cases no more than 1.03, in some cases no more than 1.01, and in some cases 1.

The longitudinal bending stiffness of the carcass 36 can be deemed to be "asymmetric" (i.e., the carcass 36 may be significantly stiffer when subject to loading tending to longitudinally bend it inwardly than when subject to loading tending to longitudinally bend it outwardly, or vice versa) if the longitudinal rigidity of the carcass 36 when subject to loading tending to longitudinally bend the carcass 36 inwardly and the longitudinal rigidity of the carcass 36 when subject to loading tending to longitudinally bend the carcass 36 outwardly are substantially different, i.e., a ratio of these longitudinal rigidities (with a higher one of them as numerator) is greater than 1.05, in some cases at least 1.1, in some cases at least 1.2, in some cases at least 1.3, in some cases at least 1.5, in some cases at least 2, and in some cases even more.

The rigidity characteristics of the track 41 may be designed to control a bending behavior of the track 41 that may enhance its traction, floatation, and/or other aspects of its performance.

Figure 21A:
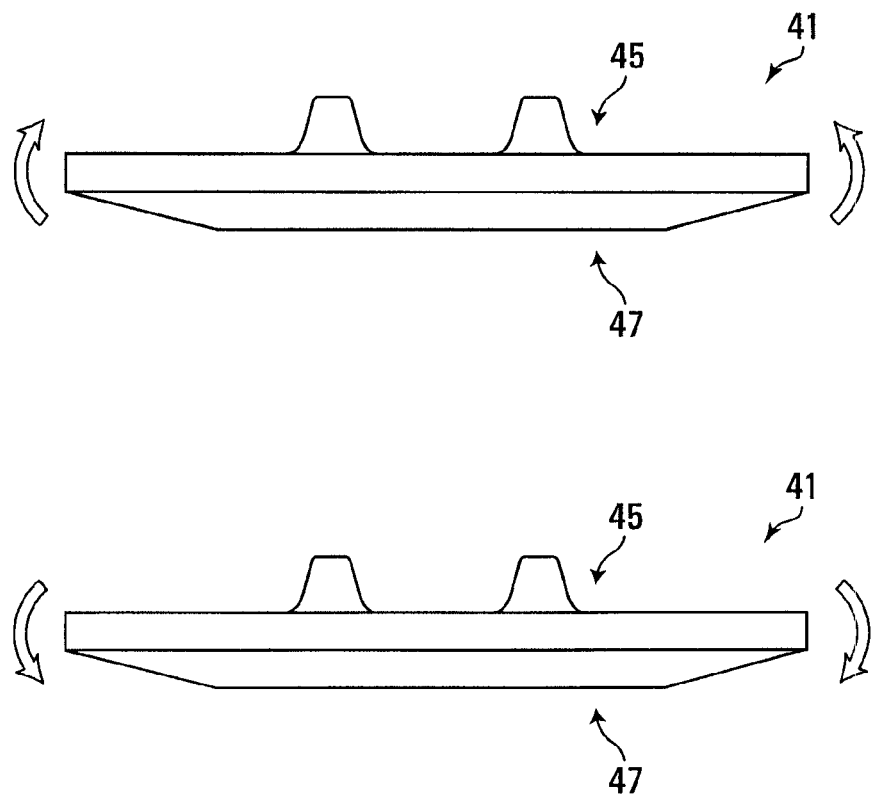
FIG. 21A shows the track having a symmetric lateral bending stiffness.
Figure 21B:
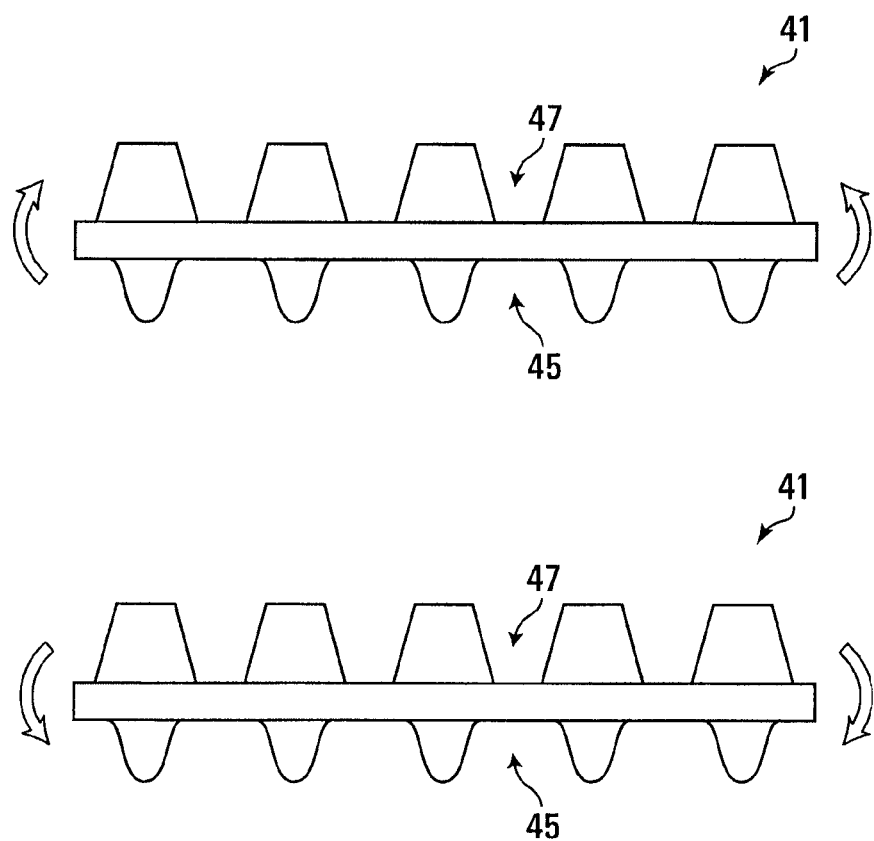
FIG. 21B shows the track having an asymmetric longitudinal bending stiffness.

For example, in some embodiments, as shown in FIGS. 21A and 21B, the lateral bending stiffness of the track 41 may be symmetric, while the longitudinal bending stiffness of the track 41 may be asymmetric. For instance, the track 41 may be substantially as laterally stiff when subject to loads tending to laterally bend it inwardly and outwardly in order to enhance floatation, while being significantly longitudinally stiffer when subject to loading tending to longitudinally bend it outwardly than when subject to loading tending to longitudinally bend it inwardly in order to facilitate its motion around the track-engaging assembly 22 (e.g., facilitate bending as it turns about the leading and trailing idler wheels $50_1$, $50_2$, $50_{11}$, $50_{12}$ and the drive wheel 24) and help maintain a generally straight shape of the bottom run 66 of the track 41 for proper traction (e.g., help avoid bending of the bottom run 66 of the track 41 in gaps between longitudinally-adjacent ones of the roller wheels $50_3$-$50_{10}$).

For instance, in some embodiments, a ratio of the widthwise rigidity of the track 41 when subject to loading tending to laterally bend the track 41 inwardly and the widthwise rigidity of the track 41 when subject to loading tending to laterally bend the track 41 outwardly (with a higher one of these values as numerator, if they slightly differ) may be no more than 1.05, in some cases no more than 1.03, in some cases no more than 1.01, and in some cases 1, while a ratio of the longitudinal rigidity of the track 41 when subject to loading tending to longitudinally bend the track 41 outwardly over the longitudinal rigidity of the track 41 when subject to loading tending to longitudinally bend the track 41 inwardly may be greater than 1.05, in some cases at least 1.1, in some cases at least 1.2, in some cases at least 1.3, in some cases at least 1.5, in some cases at least 2, and in some cases even more. These ratios may have any other suitable value in other embodiments.

Figure 22A:
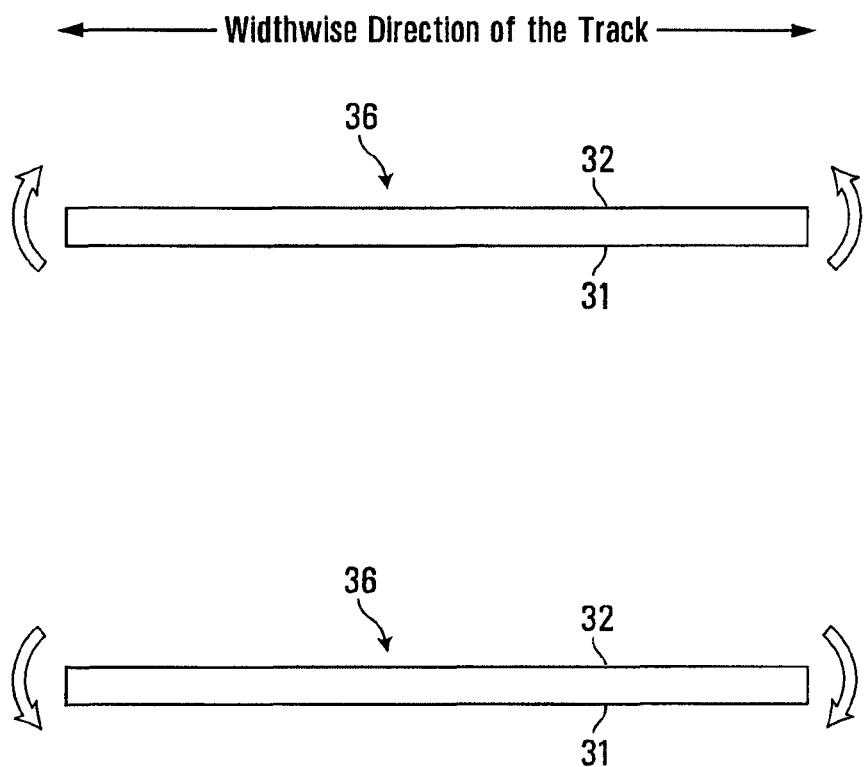
FIG. 22A shows the carcass of the track having a symmetric lateral bending stiffness.
Figure 22B:
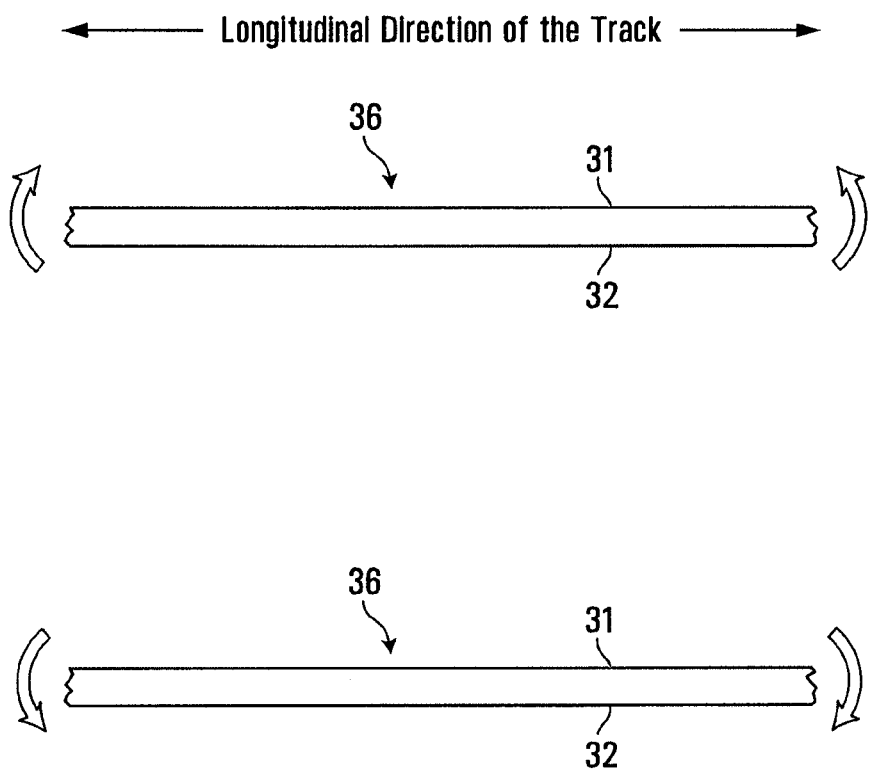
FIG. 22B shows the carcass of the track having an asymmetric longitudinal bending stiffness.

This may be achieved, in some embodiments, based on the rigidity characteristics of the carcass 36. For example, in some embodiments, as shown in FIGS. 22A and 22B, the lateral bending stiffness of the carcass 36 may be symmetric, while the longitudinal bending stiffness of the carcass 36 may be asymmetric. For instance, the carcass 36 may be substantially as laterally stiff when subject to loads tending to laterally bend it inwardly and outwardly, while being significantly longitudinally stiffer when subject to loading tending to longitudinally bend it outwardly than when subject to loading tending to longitudinally bend it inwardly.

For example, in some embodiments, a ratio of the widthwise rigidity of the carcass 36 when subject to loading tending to laterally bend the carcass 36 inwardly and the widthwise rigidity of the carcass 36 when subject to loading tending to laterally bend the carcass 36 outwardly (with a higher one of these values as numerator, if they slightly differ) may be no more than 1.05, in some cases no more than 1.03, in some cases no more than 1.01, and in some cases 1, while a ratio of the longitudinal rigidity of the carcass 36 when subject to loading tending to longitudinally bend the carcass 36 outwardly over the longitudinal rigidity of the carcass 36 when subject to loading tending to longitudinally bend the carcass 36 inwardly may be greater than 1.05, in some cases at least 1.1, in some cases at least 1.2, in some cases at least 1.3, in some cases at least 1.5, in some cases at least 2, and in some cases even more. These ratios may have any other suitable value in other embodiments.

The rigidity characteristics of the carcass 36 and, therefore, those of the track 41, may be designed in any suitable way in various embodiments in order to control the bending behavior of the track 41. Examples of this are provided below.

I. Laterally Stiff to Inward Bending and Longitudinally Stiff to Outward Bending In some embodiments, the widthwise rigidity of the carcass 36 when subject to loading tending to laterally bend it inwardly and the longitudinal rigidity of the carcass 36 when subject to loading tending to longitudinally bend it outwardly may both be relatively high. In other words, the carcass 36 may be laterally stiff when subject to loading tending to bend it inwardly and longitudinally stiff when subject to loading tending to bend it outwardly. This may help to enhance floatation.

For example, in some embodiments, a ratio of the widthwise rigidity of the carcass 36 when subject to loading tending to laterally bend it inwardly over the longitudinal rigidity of the carcass 36 when subject to loading tending to longitudinally bend it outwardly may be at least 0.7, in some cases at least 0.75, in some cases at least 0.8, in some cases at least 0.9, in some cases at least 1, and in some cases even more.

In some examples of implementation, the widthwise rigidity of the carcass 36 when subject to loading tending to laterally bend it inwardly and the longitudinal rigidity of the carcass 36 when subject to loading tending to longitudinally bend it outwardly may be as close to one another as possible. Thus, the ratio of the widthwise rigidity of the carcass 36 when subject to loading tending to laterally bend it inwardly over the longitudinal rigidity of the carcass 36 when subject to loading tending to longitudinally bend it outwardly may be as close to 1 as possible. For instance, in some embodiments, the ratio of the widthwise rigidity of the carcass 36 when subject to loading tending to laterally bend it inwardly over the longitudinal rigidity of the carcass 36 when subject to loading tending to longitudinally bend it outwardly may be between 0.8 and 1.2, in some cases between 0.9 and 1.1, in some case between 0.95 and 1.05, in some cases between 0.98 and 1.02, and in some cases 1.

The ratio of the widthwise rigidity of the carcass 36 when subject to loading tending to laterally bend it inwardly over the longitudinal rigidity of the carcass 36 when subject to loading tending to longitudinally bend it outwardly may have any other suitable value in other embodiments.

II. Increased Spacing of Reinforcements to Increase Rigidity

In some embodiments, respective ones of the reinforcements $68_1$-$68_R$ embedded in the elastomeric material 37 of the carcass 36 may be spaced apart from one another significantly in order to increase the widthwise rigidity and/or the longitudinal rigidity of the carcass 36.

Figure 23:
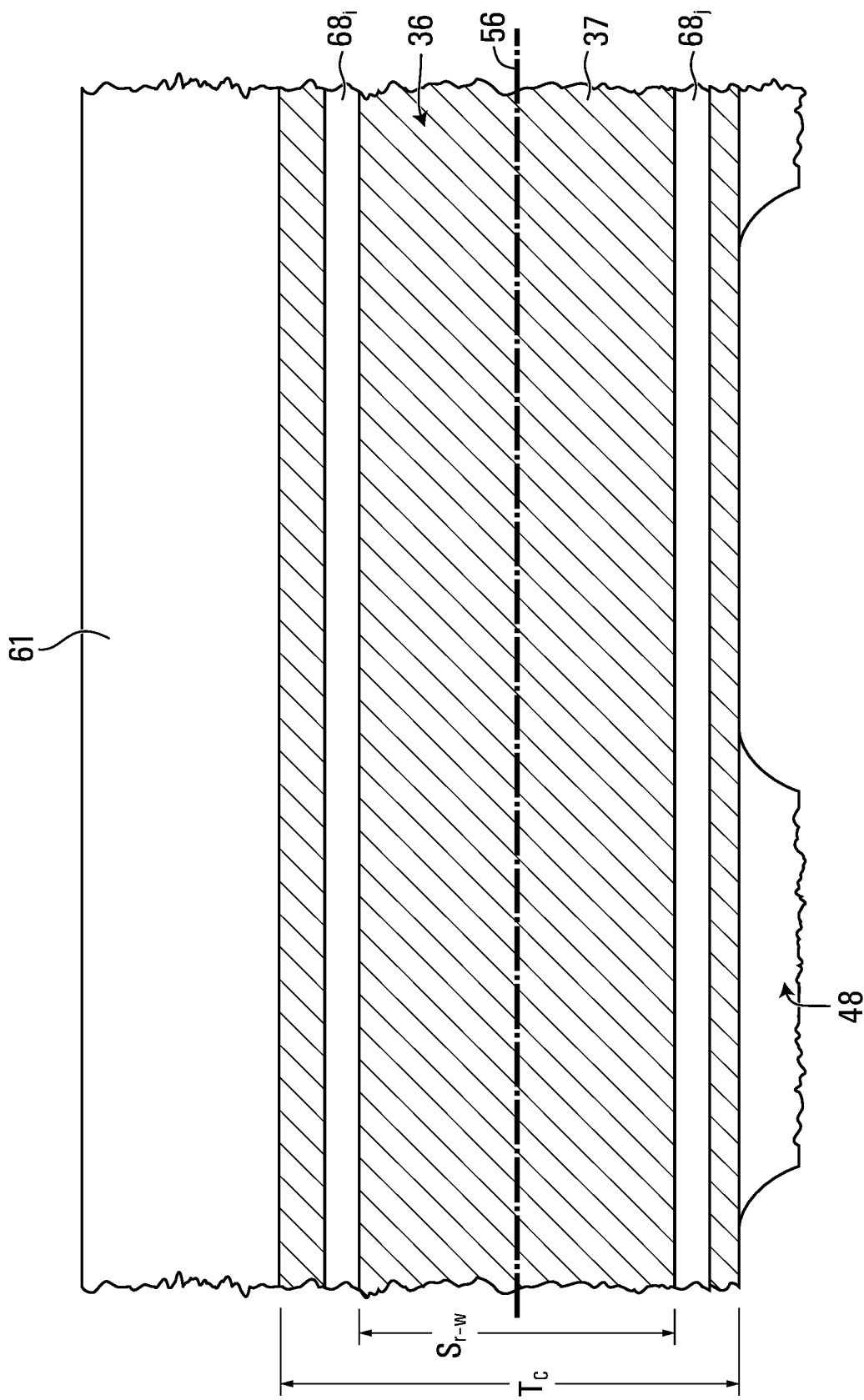
FIG. 23 shows a partial cross-sectional view of the track taken along the widthwise direction of the track including reinforcements that mainly stiffen the track laterally.

For example, in some embodiments, as shown in FIG. 23, a reinforcement $68_i$ and a reinforcement $68_j$ that mainly stiffen the track 41 laterally and that are adjacent to one another in the thickness direction of the track 41 (i.e., there is no reinforcement mainly stiffening the track 41 laterally between the reinforcements $68_i$, $68_j$) may be spaced apart significantly in order to increase the track's widthwise rigidity. Each of the reinforcements $68_i$, $68_j$ may thus be spaced apart significantly from the lateral-bending neutral axis 56 of the carcass 36.

For instance, in some embodiments, a ratio of a spacing $S_{r-w}$ of the reinforcements $68_i$, $68_j$ in the thickness direction of the track 41 over the thickness $T_c$ of the carcass 36 may be at least 0.4, in some cases at least 0.5, in some cases at least 0.6, and in some cases even more. As an example, in some embodiments, where the thickness $T_c$ of the carcass 36 is 5 mm, the spacing $S_{r-w}$ of the reinforcements $68_i$, $68_j$ may be at least 2 mm, in some cases at least 2.5 mm, in some cases at least 3 mm, and in some cases even more. The ratio of the spacing $S_{r-w}$ of the reinforcements $68_i$, $68_j$ over the thickness $T_c$ of the carcass 36, the spacing $S_{r-w}$ of the reinforcements $68_i$, $68_j$, and/or the thickness $T_c$ of the carcass 36 may have any other suitable value in other embodiments.

In some embodiments, a stiffness of the reinforcement $68_i$ in the widthwise direction of the track 41 and a stiffness of the reinforcement $68_j$ in the widthwise direction of the track 41 may be substantially identical. For instance, in some cases, the reinforcements $68_i$, $68_j$ may be of a common type or structure. For example, the reinforcements $68_i$, $68_j$ may be substantially identical layers of reinforcing cables or of reinforcing fabric.

Alternatively, in some embodiments, the stiffness of the reinforcement $68_i$ in the widthwise direction of the track 41 and the stiffness of the reinforcement $68_j$ in the widthwise direction of the track 41 may be substantially different. For example, in some cases, the reinforcements $68_i$, $68_j$ may be layers of reinforcing cables that differ from one another (e.g., in terms of cable material, diameter, pitch, etc.). As another example, in some cases, the reinforcements $68_i$, $68_j$ may be layers of reinforcing fabric that differ from one another (e.g., in terms of fabric material, configuration (e.g., weft, warp, bias, etc.), etc.). As yet another example, in some cases, the reinforcements $68_i$, $68_j$ may be respective ones of a layer of reinforcing cable and a layer of reinforcing fabric.

Figure 24:
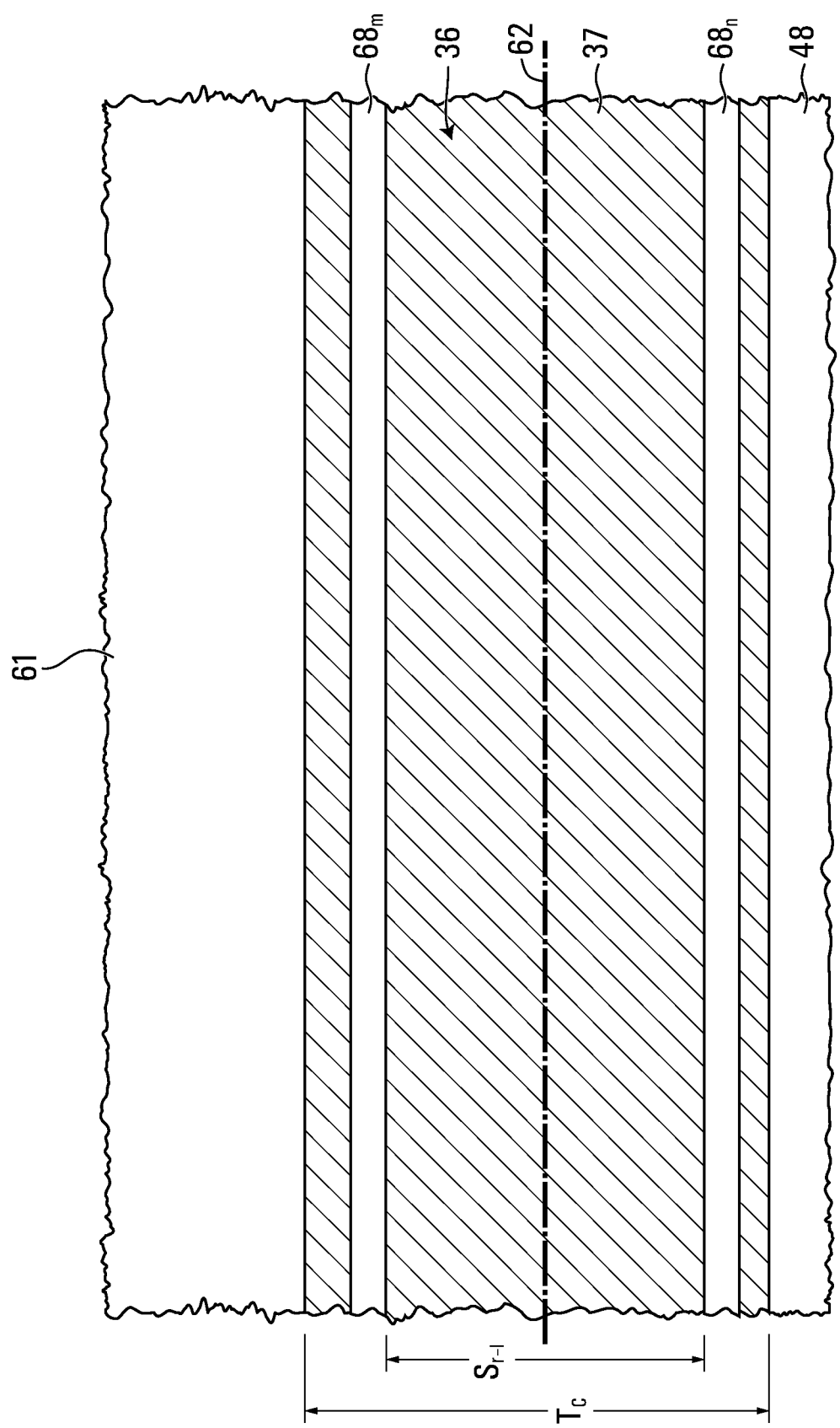
FIG. 24 shows a partial cross-sectional view of the track taken along the longitudinal direction of the track including reinforcements that mainly stiffen the track longitudinally.

In a similar manner, in some embodiments, as shown in FIG. 24, a reinforcement $68_m$ and a reinforcement $68_n$ that mainly stiffen the track 41 longitudinally and that are adjacent to one another in the thickness direction of the track 41 (i.e., there is no reinforcement mainly stiffening the track 41 longitudinally between the reinforcements $68_m$, $68_n$) may be spaced apart significantly in order to increase the track's longitudinal rigidity. Each of the reinforcements $68_m$, $68_n$ may thus be spaced apart significantly from the longitudinal-bending neutral axis 62 of the carcass 36.

For instance, in some embodiments, a ratio of a spacing $S_{r-l}$ of the reinforcements $68_m$, $68_n$ in the thickness direction of the track 41 over the thickness $T_c$ of the carcass 36 may be at least 0.4, in some cases at least 0.5, in some cases at least 0.6, and in some cases even more. As an example, in some embodiments, where the thickness $T_c$ of the carcass 36 is 5 mm, the spacing $S_r$ of the reinforcements $68_m$, $68_n$ may be at least 2 mm, in some cases at least 2.5 mm, in some cases at least 3 mm, and in some cases even more. The ratio of the spacing $S_{r-l}$ of the reinforcements $68_m$, $68_n$ over the thickness $T_c$ of the carcass 36, the spacing $S_{r-l}$ of the reinforcements $68_m$, $68_n$, and/or the thickness $T_c$ of the carcass 36 may have any other suitable value in other embodiments.

In some embodiments, a stiffness of the reinforcement $68_m$ in the longitudinal direction of the track 41 and a stiffness of the reinforcement $68_n$ in the longitudinal direction of the track 41 may be substantially identical. For instance, in some cases, the reinforcements $68_m$, $68_n$ may be of a common type or structure. For example, the reinforcements $68_m$, $68_n$ may be substantially identical layers of reinforcing cables or of reinforcing fabric.

Alternatively, in some embodiments, the stiffness of the reinforcement $68_m$ in the longitudinal direction of the track 41 and the stiffness of the reinforcement $68_n$ in the longitudinal direction of the track 41 may be substantially different. For example, in some cases, the reinforcements $68_m$, $68_n$ may be layers of reinforcing cables that differ from one another (e.g., in terms of cable material, diameter, pitch, etc.). As another example, in some cases, the reinforcements $68_m$, $68_n$ may be layers of reinforcing fabric that differ from one another (e.g., in terms of fabric material, configuration (e.g., weft, warp, bias, etc.), etc.). As yet another example, in some cases, the reinforcements $68_m$, $68_n$ may be respective ones of a layer of reinforcing cable and a layer of reinforcing fabric.

III. Positioning of Neutral Axes

In some embodiments, a position of the lateral-bending neutral axis 56 of the carcass 36 and/or a position of the longitudinal-bending neutral axis 62 of the carcass 36 may be controlled in order to regulate the bending behavior of the track 41.

Figure 25:
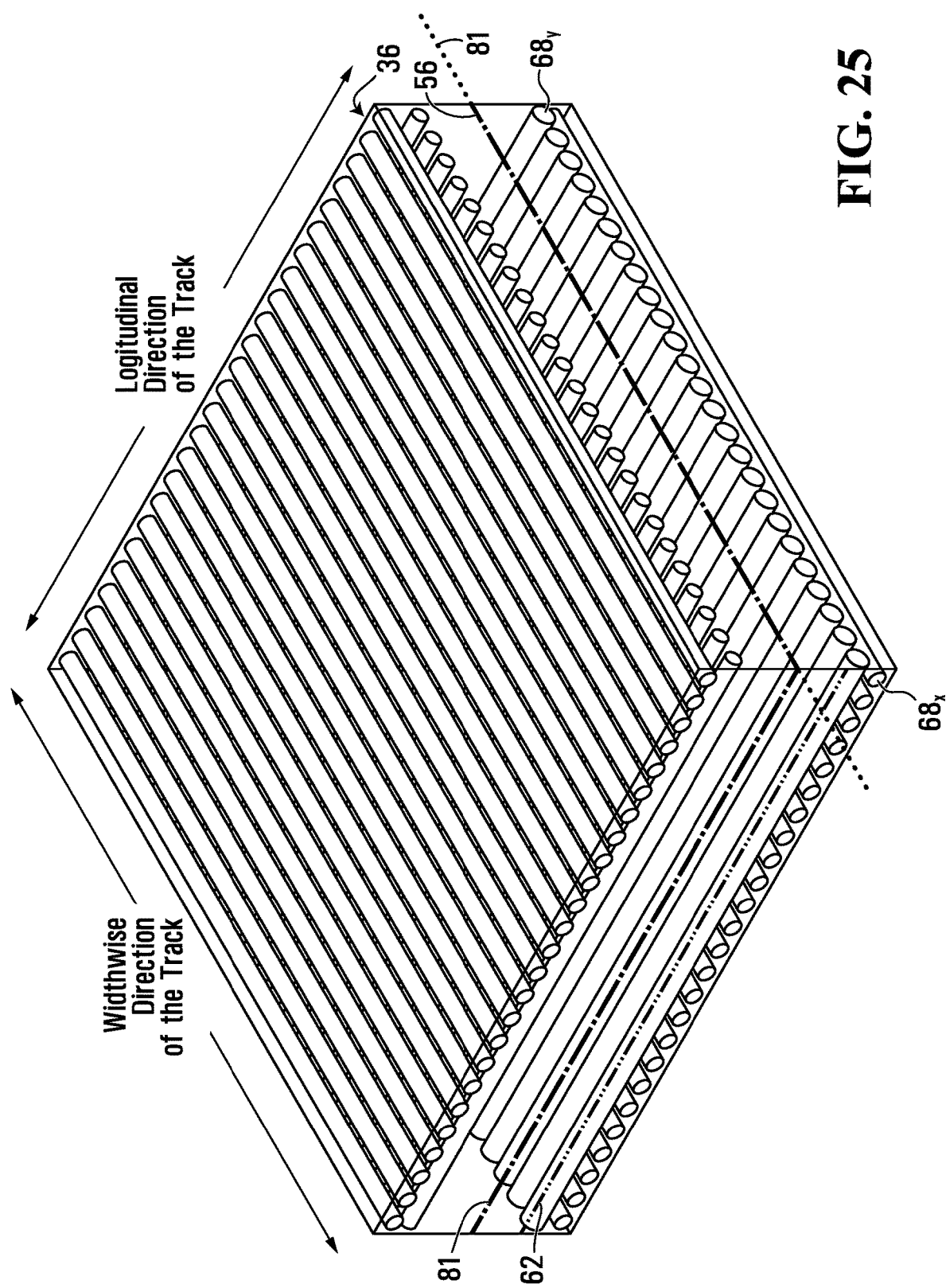
FIG. 25 shows a perspective view of a segment of the carcass of the track including a lateral-bending neutral axis and a longitudinal-bending neutral axis of the carcass that are offset in a thickness direction of the track.
Figure 26:
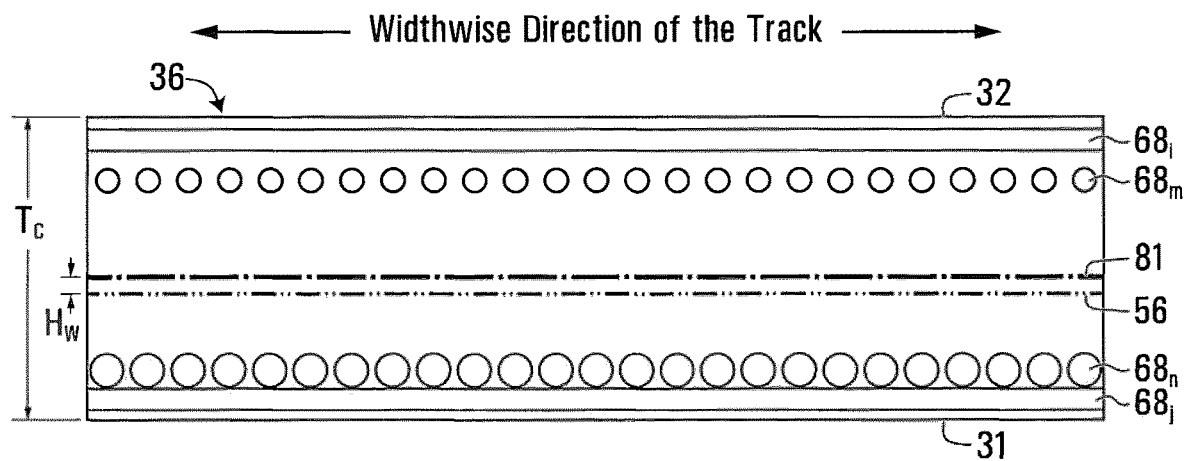
FIG. 26 shows a partial cross-sectional view of the segment of the carcass of the track of FIG. 25.
Figure 27:
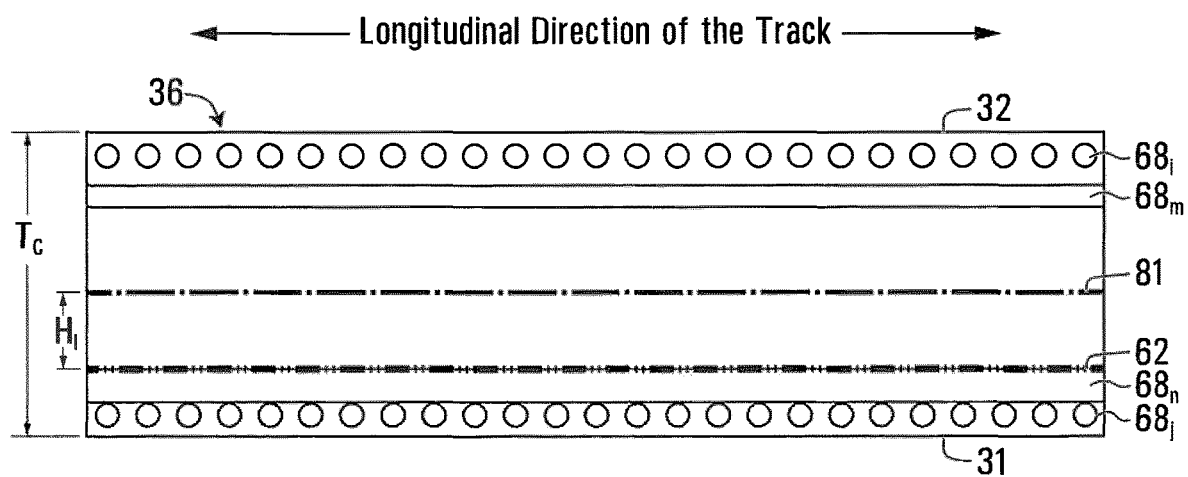
FIG. 27 shows another partial cross-sectional view of the segment of the carcass of the track of FIG. 25.

For example, in some embodiments, as shown in FIGS. 25 to 27, respective ones of the reinforcements $68_1$-$68_R$ which may have different levels of bending stiffness can be strategically positioned within the carcass 36 to control the position of the lateral-bending neutral axis 56 of the carcass 36 and/or the position of the longitudinal-bending neutral axis 62 of the carcass 36 in order regulate the bending behavior of the track 41. For instance, the position of the lateral-bending neutral axis 56 of the carcass 36 and the position of the longitudinal-bending neutral axis 62 of the carcass 36 may be substantially different from one another. That is, the lateral-bending neutral axis 56 of the carcass 36 and the longitudinal-bending neutral axis 62 of the carcass 36 may be offset in the thickness direction of the track 41.

A bending stiffness of a reinforcement $68_x$ in the widthwise direction of the track 41 may be measured using a three-point bending test performed on a sample of the reinforcement $68_x$ to subject the reinforcement $68_x$ to loading tending to bend the reinforcement $68_x$ in the widthwise direction of the track 41 until a predetermined deflection of the reinforcement $68_x$ is reached and measure a bending load at that predetermined deflection of the reinforcement $68_x$, and calculating the bending stiffness of the reinforcement $68_x$ in the widthwise direction of the track 41 as a ratio of that bending load over that predetermined deflection.

The bending stiffness of the reinforcement $68_x$ in the widthwise direction of the track 41 depends on a product of an area moment of inertia (i.e., a second moment of area) of a cross-section of the reinforcement $68_x$ normal to the widthwise direction of the track 41 and a modulus of elasticity (i.e., Young's modulus) of a material of the reinforcement $68_x$. As such, the bending stiffness of the reinforcement $68_x$ in the widthwise direction of the track 41 may be increased or decreased by increasing or decreasing the area moment of inertia of the cross-section of the reinforcement $68_x$ normal to the widthwise direction of the track 41 and/or the modulus of elasticity of the material of the reinforcement $68_x$.

Similarly, a bending stiffness of a reinforcement $68_y$ in the longitudinal direction of the track 41 may be measured using a three-point bending test performed on a sample of the reinforcement $68_y$ to subject the reinforcement $68_y$ to loading tending to bend the reinforcement $68_y$ in the longitudinal direction of the track 41 until a predetermined deflection of the reinforcement $68_y$ is reached and measure a bending load at that predetermined deflection of the reinforcement $68_y$, and calculating the bending stiffness of the reinforcement $68_y$ in the longitudinal direction of the track 41 as a ratio of that bending load over that predetermined deflection.

The bending stiffness of the reinforcement $68_y$ in the longitudinal direction of the track 41 depends on a product of an area moment of inertia (i.e., a second moment of area) of a cross-section of the reinforcement $68_y$ normal to the longitudinal direction of the track 41 and a modulus of elasticity (i.e., Young's modulus) of a material of the reinforcement $68_y$. As such, the bending stiffness of the reinforcement $68_y$ in the longitudinal direction of the track 41 may be increased or decreased by increasing or decreasing the area moment of inertia of the cross-section of the reinforcement $68_y$ normal to the longitudinal direction of the track 41 and/or the modulus of elasticity of the material of the reinforcement $68_y$.

In this embodiment, a reinforcement $68_i$ and a reinforcement $68_j$ have substantially identical or similar levels of bending stiffness in the widthwise direction of the track 41, while a reinforcement $68_m$ and a reinforcement $68_n$ have substantially different levels of bending stiffness in the longitudinal direction of the track 41 such that the lateral bending stiffness of the carcass 36 is symmetric and the longitudinal bending stiffness of the carcass 36 is asymmetric.

More particularly, in this embodiment, the bending stiffness of the reinforcement $68_i$ in the widthwise direction of the track 41 and the bending stiffness of the reinforcement $68_j$ in the widthwise direction of the track 41 may be substantially identical or similar. For example, in some embodiments, a ratio of the bending stiffness of the reinforcement $68_i$ in the widthwise direction of the track 41 and the bending stiffness of the reinforcement $68_j$ in the widthwise direction of the track 41 (with a higher one of these values as numerator, if they slightly differ) may be no more than 1.1, in some cases no more than 1.05, in some cases no more than 1.02, and in some cases 1. This ratio may have any other suitable value in other embodiments.

For example, in some embodiments, the modulus of elasticity of the material of the reinforcement $68_i$ and the modulus of elasticity of the material of the reinforcement $68_j$ may be substantially identical or similar. For instance, in some embodiments, a ratio of the modulus of elasticity of the material of the reinforcement $68_i$ and the modulus of elasticity of the material of the reinforcement $68_j$ (with a higher one of these values as numerator, if they slightly differ) may be no more than 1.1, in some cases no more than 1.05, in some cases no more than 1.02, and in some cases 1. This ratio may have any other suitable value in other embodiments.

In some examples of implementation, the reinforcements $68_i$, $68_j$ may be substantially identical, i.e., the material and configuration of the reinforcements $68_i$, $68_j$ may be substantially the same. For instance, in some cases, the reinforcements $68_i$, $68_j$ may be substantially identical layers of reinforcing cables or of reinforcing fabric.

Alternatively, in some examples of implementation, the reinforcements $68_i$, $68_j$ may be substantially different, i.e., the material and/or configuration of the reinforcements $68_i$, $68_j$ may be substantially different. For instance, in some cases, the reinforcements $68_i$, $68_j$ may be layers of reinforcing cables that differ from one another (e.g., in terms of cable material, diameter, pitch, etc.). In some cases, the reinforcements $68_i$, $68_j$ may be layers of reinforcing fabric that differ from one another (e.g., in terms of fabric material, configuration (e.g., weft, warp, bias, etc.), etc.). In some cases, the reinforcements $68_i$, $68_j$ may be respective ones of a layer of reinforcing cable and a layer of reinforcing fabric.

Also, in this embodiment, the bending stiffness of the reinforcement $68_m$ in the longitudinal direction of the track 41 and the bending stiffness of the reinforcement $68_n$ in the longitudinal direction of the track 41 are substantially different. For example, in some embodiments, a ratio of the bending stiffness of the reinforcement $68_m$ in the longitudinal direction of the track 41 and the bending stiffness of the reinforcement $68_n$ in the longitudinal direction of the track 41 (with a higher one of these values as numerator) may be at least 1.1, in some cases at least 1.2, in some cases at least 1.3, in some cases at least 1.4, in some cases at least 1.5, in some cases at least 2, and in some cases even more. This ratio may have any other suitable value in other embodiments.

For example, in some embodiments, the modulus of elasticity of the material of the reinforcement $68_m$ and the modulus of elasticity of the material of the reinforcement $68_n$ may be substantially different. For instance, in some embodiments, a ratio of the modulus of elasticity of the material of the reinforcement $68_m$ and the modulus of elasticity of the material of the reinforcement $68_n$ (with a higher one of these values as numerator) may be at least 1.1, in some cases at least 1.2, in some cases at least 1.3, in some cases at least 1.4, in some cases at least 1.5, in some cases at least 2, and in some cases even more. This ratio may have any other suitable value in other embodiments.

The reinforcements $68_m$, $68_n$ may thus be substantially different, i.e., the material and/or configuration of the reinforcements $68_m$, $68_n$ are substantially different. For example, in some cases, the reinforcements $68_m$, $68_n$ may be layers of reinforcing cables that differ from one another (e.g., in terms of cable material, diameter, pitch, etc.). In some cases, the reinforcements $68_m$, $68_n$ may be layers of reinforcing fabric that differ from one another (e.g., in terms of fabric material, configuration (e.g., weft, warp, bias, etc.), etc.). In some cases, the reinforcements $68_m$, $68_n$ may be respective ones of a layer of reinforcing cable and a layer of reinforcing fabric.

As an alternative, in some embodiments, the reinforcements $68_m$, $68_n$ may be substantially identical, i.e., the material and/or configuration of the reinforcements $68_m$, $68_n$ may be substantially identical, but there may be an additional reinforcement between the longitudinal-bending neutral axis 62 of the carcass 36 and a given one of the inner surface 32 and the ground-engaging outer surface 31 of the carcass 36.

In this embodiment, the reinforcements $68_i$, $68_j$ result in the lateral bending stiffness of the carcass 36 being symmetric with the lateral-bending neutral axis 56 of the carcass 36 being at or near a centerline 81 of the carcass 36 in the thickness direction of the track 41, while the reinforcements $68_m$, $68_n$ result in the longitudinal bending stiffness of the carcass 36 being asymmetric with the longitudinal-bending neutral axis 62 of the carcass 36 being offset from the centerline 81 of the carcass 36 in the thickness direction of the track 41. The lateral-bending neutral axis 56 of the carcass 36 is thus closer to the centerline 81 of the carcass 36 than the longitudinal-bending neutral axis 62 of the carcass 36 in the thickness direction of the track 41.

For example, in some embodiments, as shown in FIG. 26, a distance $H_w$ between the lateral-bending neutral axis 56 of the carcass 36 and the centerline 81 of the carcass 36 may be null or very little. For instance, in some embodiment, a ratio of the distance $H_w$ between the lateral-bending neutral axis 56 of the carcass 36 and the centerline 81 of the carcass 36 over the thickness $T_c$ of the carcass 36 may be no more than 0.1, in some cases no more than 0.05, in some cases no more than 0.02, and in some cases even less or even 0 (i.e., the lateral-bending neutral axis 56 of the carcass 36 is located at the centerline 81 of the carcass 36). This ratio may have any other suitable value in other embodiments.

Also, in some embodiments, the longitudinal-bending neutral axis 62 of the carcass 36 may be located closer to a given one of the inner surface 32 and the outer surface 31 of the carcass 36 than to the centerline 81 of the carcass 36 in the thickness direction of the track 41. For instance, in this embodiment, as shown in FIG. 27, the longitudinal-bending neutral axis 62 of the carcass 36 is located closer to the outer surface 31 of the carcass 66 than to the centerline 81 of the carcass 36 in the thickness direction of the track 41, such that the longitudinal rigidity of the carcass 36 when subject to loading tending to longitudinally bend the carcass 36 outwardly is substantially greater than the longitudinal rigidity of the carcass 36 when subject to loading tending to longitudinally bend the carcass 36 inwardly. In other embodiments, this may be reversed, with the longitudinal-bending neutral axis 62 of the carcass 36 located closer to the inner surface 32 of the carcass 66 than to the centerline 81 of the carcass 36 in the thickness direction of the track 41, such that the longitudinal rigidity of the carcass 36 when subject to loading tending to longitudinally bend the carcass 36 inwardly is substantially greater than the longitudinal rigidity of the carcass 36 when subject to loading tending to longitudinally bend the carcass 36 outwardly.

A distance $H_l$ between the longitudinal-bending neutral axis 62 of the carcass 36 and the centerline 81 of the carcass 36 may be significant. For example, in some embodiment, a ratio of the distance $H_l$ between the longitudinal-bending neutral axis 62 of the carcass 36 and the centerline 81 of the carcass 36 over the thickness $T_c$ of the carcass 36 may be at least 0.2, in some cases at least 0.3, in some cases at least 0.4, in some cases at least 0.5, in some cases at least 0.6, in some cases at least 0.7, in some cases at least 0.8, and in some cases even more. This ratio may have any other suitable value in other embodiments.

In this embodiment, to increase the lateral bending stiffness of the carcass 36, which is symmetric, the reinforcements $68_i$, $68_j$ that mainly stiffen the carcass 36 laterally may be spaced from one another in the thickness direction of the track 41 as much as possible. More particularly, in this embodiment, the reinforcements $68_i$, $68_j$ that mainly stiffen the carcass 36 laterally are more spaced apart from one another in the thickness direction of the track 41 than the reinforcements $68_m$, $68_n$ that mainly stiffen the carcass 36 longitudinally. That is, the spacing $S_{r-w}$ of the reinforcements $68_i$, $68_j$ in the thickness direction of the track 41 is greater than the spacing $S_{r-l}$ of the reinforcements $68_m$, $68_n$ in the thickness direction of the track 41.

In some embodiments, since the reinforcements $68_m$, $68_n$ are disposed on either side of the longitudinal-bending neutral axis 62 of the carcass 36 in the thickness direction of the track 41, a given one of the reinforcements $68_m$, $68_n$ will be under compression when the track 41 bends around corners of the track-engaging assembly 22 (e.g., about the drive wheel 42 and about corner ones of the idler wheels $50_1$-$50_{12}$).

IV. Fabric Significantly Varying in Stiffness in Different Directions

Figure 28:
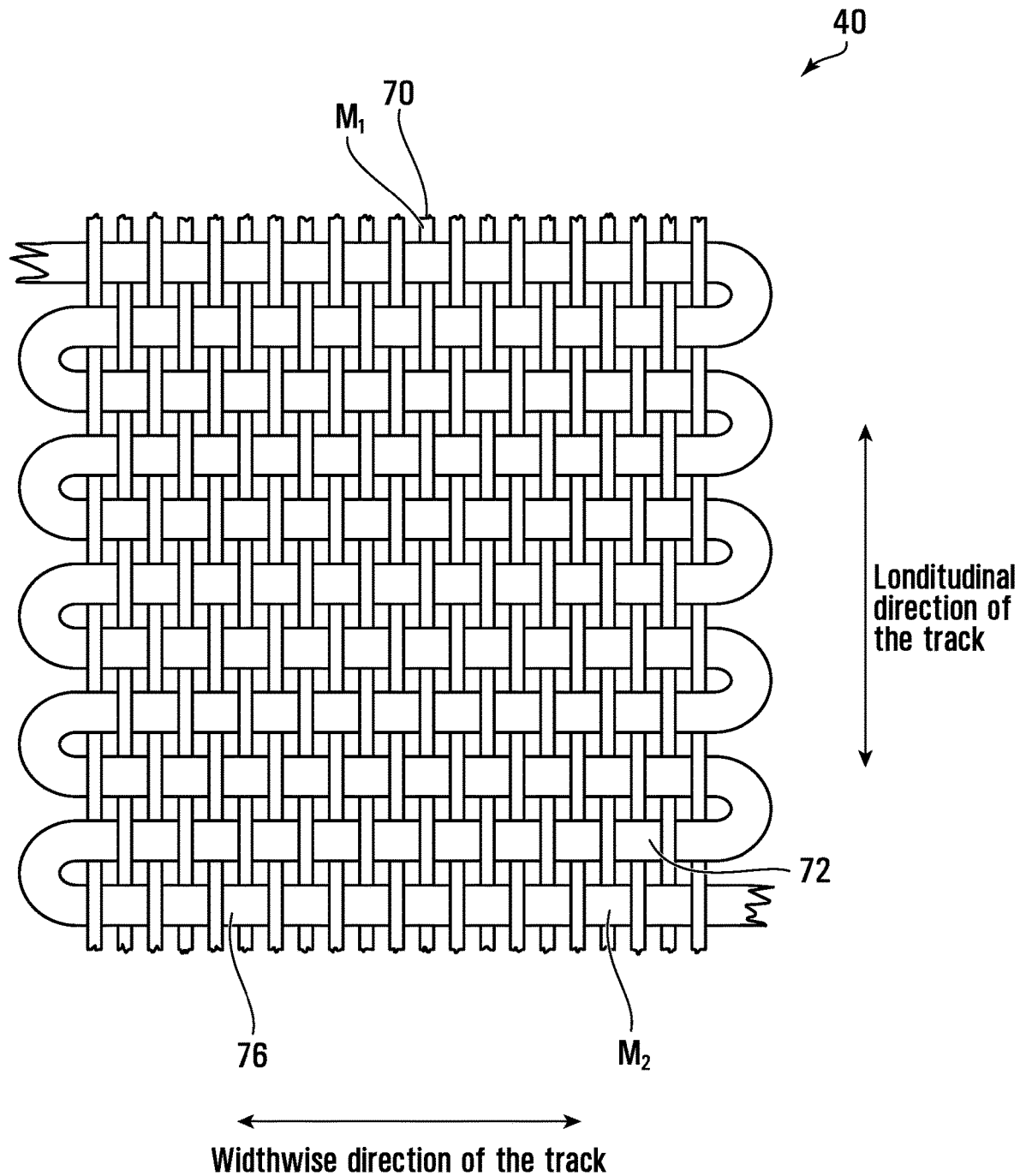
FIG. 28 shows a layer of reinforcing fabric of the carcass of the track in accordance with an embodiment in which the layer of reinforcing fabric exhibits different stiffness characteristics in difference directions.
Figure 29:
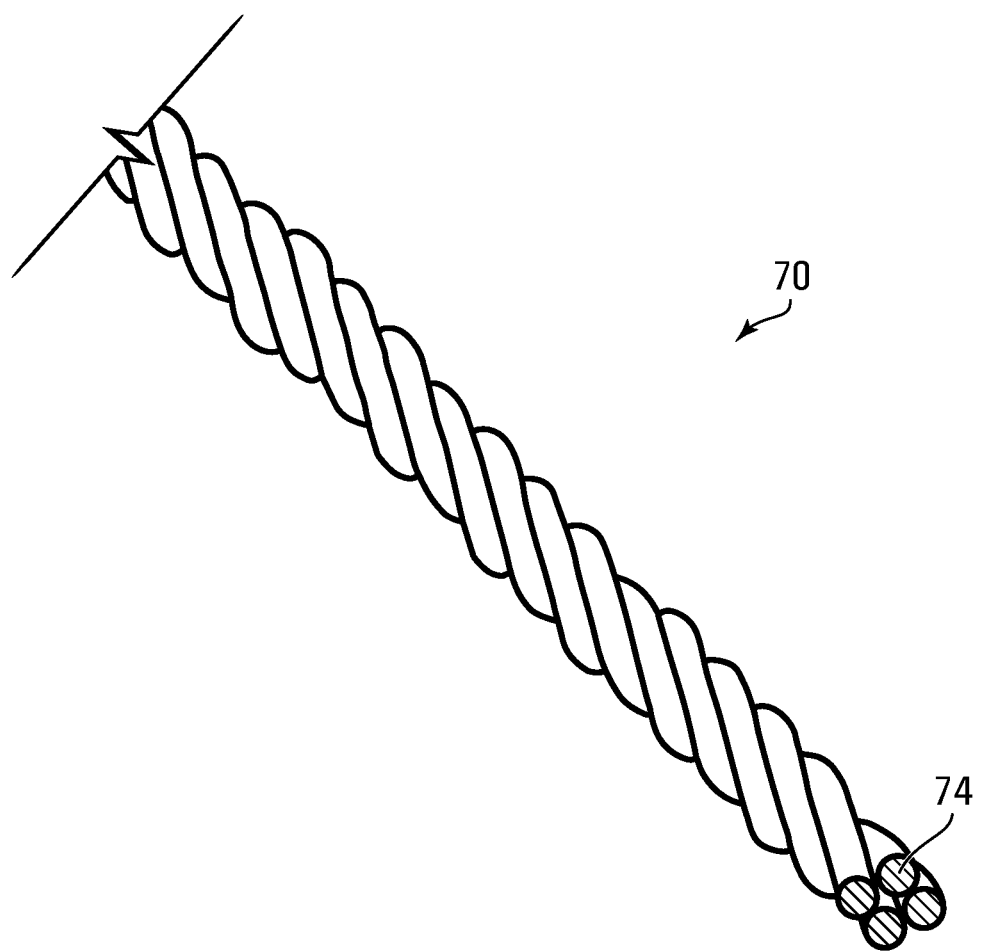
FIG. 29 shows an example of an embodiment of a warp element of the layer of reinforcing fabric of FIG. 28.

In some embodiments, as shown in FIG. 28, a layer of reinforcing fabric 40 of the track 41 may exhibit significantly different stiffness characteristics in different directions.

For example, in this embodiment, the layer of reinforcing fabric 40 may be significantly stiffer in the widthwise direction of the track 41 than in the longitudinal direction of the track 41. This may help to increase the widthwise rigidity of the track 41 to enhance traction and floatation, without correspondingly increasing the longitudinal rigidity of the track 41. For instance, in some embodiments, a ratio of a stiffness of the layer of reinforcing fabric 40 in the widthwise direction of the track over a stiffness of the layer of reinforcing fabric 40 in the longitudinal direction of the track may be at least 2, in some cases at least 4, in some cases at least 6, in some cases at least 8, in some cases at least 10, and in some cases even greater.

In this embodiment, the layer of reinforcing fabric 40 comprises a plurality of elongated fabric elements 70, 72 that are oriented differently and differ in stiffness (e.g., in modulus of elasticity and/or moment of inertia), such that the layer of reinforcing fabric 40 is stiffer in the widthwise direction of the track 41 than in the longitudinal direction of the track 41. More particularly, in this embodiment, the elongated fabric elements 70 are generally oriented in the longitudinal direction of the track 41, while the elongated fabric elements 72 are generally oriented in the widthwise direction of the track 41 and are stiffer than the elongated fabric elements 70.

In this example of implementation, the layer of reinforcing fabric 40 is woven. The elongated fabric elements 70 can thus be viewed as "warp" elements of a "warp" of the fabric 40, while the elongated fabric elements 72 can be viewed as "weft" elements of a "weft" of the fabric 40.

More particularly, in this embodiment, the layer of reinforcing fabric 40 comprises a plurality of materials $M_1$, $M_2$ differing in stiffness. The material $M_2$ is stiffer than the material $M_1$. In this example, the warp elements 70 of the fabric 40 are made of the material $M_1$, while the weft elements 72 of the fabric 40 are made of the material $M_2$ which is stiffer than the material $M_1$. For instance, in some embodiments, a ratio of a stiffness of the material $M_2$ over a stiffness of the material $M_1$ may be at least 2, in some cases at least 4, in some cases at least 6, in some cases at least 8, in some cases at least 10, and in some cases even greater. For example, in some embodiments, a ratio of a modulus of elasticity of the material $M_2$ over a modulus of elasticity of the material $M_1$ may be at least 2, in some cases at least 4, in some cases at least 6, in some cases at least 8, in some cases at least 10, and in some cases even greater.

The materials $M_1$, $M_2$ may be implemented in any suitable way. For example, in this embodiment, the material $M_1$ is a non-composite material (i.e., a material that is not a composite material) and the material $M_2$ is a composite material. More particularly, in this embodiment, the material $M_1$ is a polymeric material and the material $M_2$ is a fiber-matrix composite material. The polymeric material $M_1$ may be nylon, polyester, polyethylene, or any other suitable polymer. The fiber-matrix composite material $M_2$ comprises a matrix in which fibers are embedded. The matrix of the fiber-matrix composite material $M_2$ may include any suitable substance. In this embodiment, the matrix is a polymeric matrix. Thus, in this example of implementation, the composite material $M_1$ is a fiber-reinforced polymeric material. The polymeric matrix of the fiber-reinforced polymeric material $M_2$ may include any suitable polymeric resin (e.g., a thermoplastic or thermosetting resin, such as epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate)

(PMMA), polycarbonate, acrylonitrile butadiene styrene (ABS), nylon, polyimide, polysulfone, polyamide-imide, self-reinforcing polyphenylene, polyester, vinyl ester, vinyl ether, polyurethane, cyanate ester, phenolic resin, etc., a hybrid thermosetting-thermoplastic resin, or any other suitable resin. The fibers of the composite material $M_2$ may be made of any suitable material (e.g., glass fibers, carbon fibers, aramid fibers (e.g., Kevlar fibers), boron fibers, silicon carbide fibers, metallic fibers, ceramic fibers, etc.).

In this example of implementation, the polymeric material $M_1$ is nylon or polyester and the composite material $M_2$ is fiberglass. The materials $M_1$, $M_2$ may be any other suitable materials in other examples of implementation.

Each warp element 70 of the fabric 40 made of the material $M_1$ is a multifilament element comprising multiple filaments 74, whereas each weft element 72 of the fabric 40 made of the material $M_2$ is a monofilament element made up of a single continuous filament 76. This may help the weft monofilament element 72 provide greater rigidity.

The weft monofilament element 72 is larger in diameter than the warp element 70. For example, in some embodiments, a ratio of a diameter of the weft monofilament element 72 over a diameter of the warp element 70 is at least 1.5, in some cases at least 2, in some cases at least 2.5, in some cases at least 3, and in some cases even more.

In this embodiment, the single continuous filament 76 of the weft monofilament element 72 is larger in diameter than a given one of the filaments 74 of the warp element 70. For example, in some embodiments, a ratio of a diameter of the single continuous filament 76 of the weft monofilament element 72 over a diameter of the given one of the filaments 74 of the warp element 70 is at least 2, in some cases at least 4, in some cases at least 6, in some cases at least 8, and in some cases even more.

As an example, in this embodiment, the material $M_1$ of the warp elements 70 of the fabric 40 is Nylon 66 having a linear density of 1400 decitex (dtex) and each warp element 70 has three filaments 74. The warp elements 70 have a density between 28 and 29 ends per inch (EPI) as measured under ASTM D3775 guidelines. The warp elements 70 have a tensile strength at break of at least 2400 N/cm² (24 MPa), an elongation at break of 25% to 45%, and an elongation at 10% of break of 3 to 5%, as measured under ASTM D5035 guidelines. The warp elements 70 have a crimp of at least 5% as measured under ASTM D3883 guidelines and an adhesion of at least 15 N/mm as measured under ASTM D4393 guidelines. The warp elements 70 also have a hot air thermal shrinkage (HAS) of 2% when exposed to 150° C. for 30 minutes as measured under ASTM D4974 guidelines. Furthermore, in this example, the weft elements 72 constitute a monofilament with a 0.8 mm diameter. The weft elements 72 have a density between 17.8 and 18.8 picks per inch (PPI), a tensile strength at break of 14 MPa, and an elongation at break of 32 to 48%. The weft elements 72 also have a HAS of 0.5% when exposed to 150° C. for 30 minutes. Lastly, in this example, the fabric 40 has a gauge (i.e., thickness) between 1.15 and 1.45 mm as measured under ASTM D1777 guidelines, and a weight between 1060 and 1220 g/m² as measured under ASTM D3776 guidelines.

As another example, in this embodiment, the material $M_1$ of the warp elements 70 of the fabric 40 is polyester having a linear density of 1100 dtex and each warp element 70 has three filaments 74. The warp elements 70 have a density between 32 and 34 EPI, a tensile strength at break of 25 MPa, an elongation at break of at least 16%, and an elongation at 10% of break of no more than 1.5%. The warp elements 70 have a crimp of at least 5% and an adhesion of 7 N/mm. The warp elements 70 also have a HAS of 4% when exposed to 150° C. for 30 minutes. Furthermore, in this example, the weft elements 72 constitute a monofilament with a 0.8 mm diameter. The weft elements 72 have a density between 13 and 15 PPI, a tensile strength at break of 9.5 MPa, and an elongation at break of no more than 52%. The weft elements 72 also have a HAS of 0.5% when exposed to 150° C. for 30 minutes. Lastly, in this example, the fabric 40 has a gauge (i.e., thickness) between 1.03 and 1.27 mm, and a weight between 900 and 1000 g/m².

The layer of fabric 40, including the warp and weft elements 70, 72 and the materials $M_1$, $M_2$, may be implemented in various other suitable ways in other embodiments.

For instance, in an example of implementation, the layer of reinforcing fabric 40 could be of the type offered for sale by Shandong Helon Polytex Chemical Fibre Co., Ltd. under product number NM80.

In this embodiment, the layer of reinforcing fabric 40 is disposed closer to the ground-engaging outer surface 31 of the carcass 36 than to the inner surface 32 of the carcass 36 in the thickness direction of the track 41. In other embodiments, the layer of reinforcing fabric 40 may be disposed closer or as close to the inner surface 32 of the carcass 36 than to the ground-engaging outer surface 31 of the carcass 36 in the thickness direction of the track 41.

The layer of reinforcing fabric 40 may be significantly stiffer in the widthwise direction of the track 41 than in the longitudinal direction of the track 41 in various other ways in other embodiments. For example, in some embodiments, the weft elements 72 and the warp elements 70 may be made of a common material but the weft elements 72 may be significantly larger in diameter than the warp elements 70.

While in this embodiment the track system 16 is part of the ATV 10, in other embodiments, a track system comprising a track constructed according to principles discussed herein may be used as part of other types of tracked vehicles.

Figure 30:
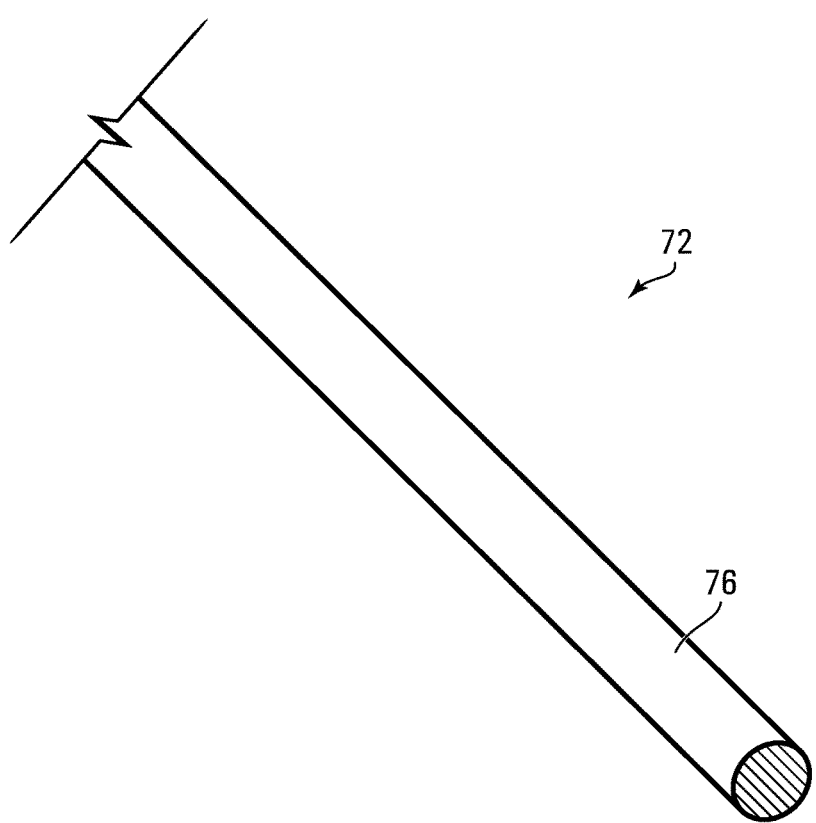
FIG. 30 shows an example of an embodiment of a weft element of the layer of reinforcing fabric of FIG. 28.

For example, in some embodiments, as shown in FIG. 30, a track system 616 comprising a track 641 constructed according to principles discussed herein may be used as part of a snowmobile 610.

Figure 31:
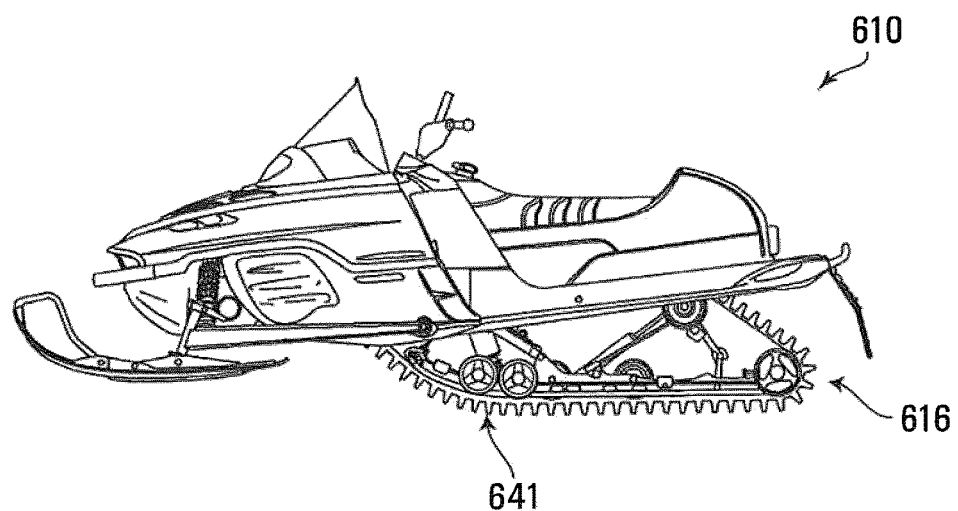
FIG. 31 shows an example of a track system of a snowmobile in accordance with another embodiment of the invention.
Figure 32:
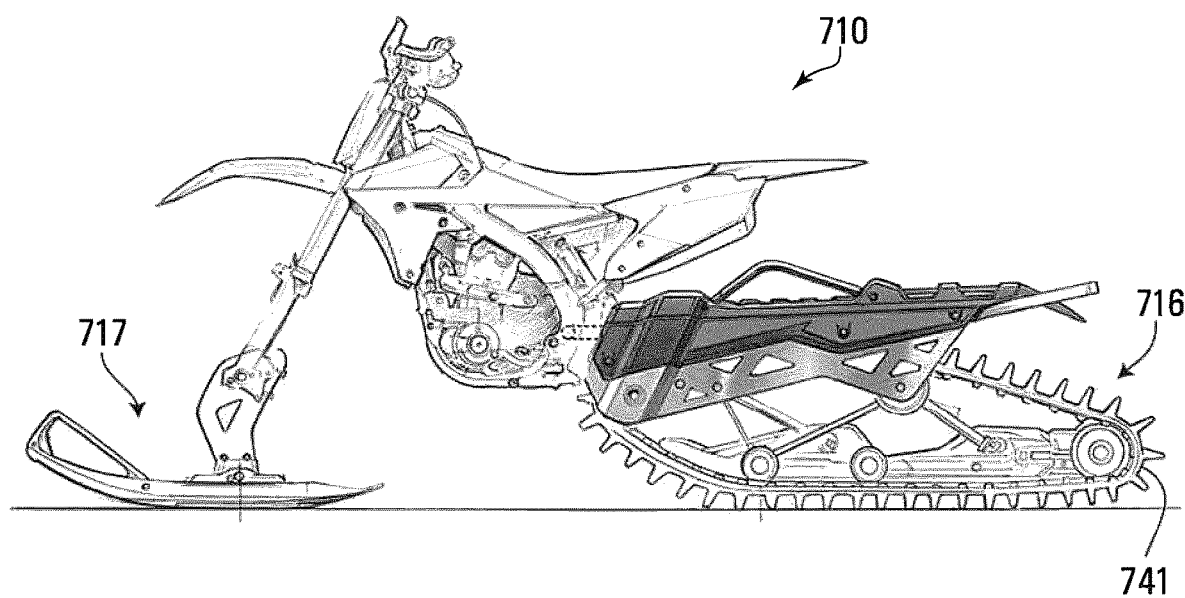
FIG. 32 shows an example of a track system of a snow bike in accordance with another embodiment of the invention.
Figure 33:
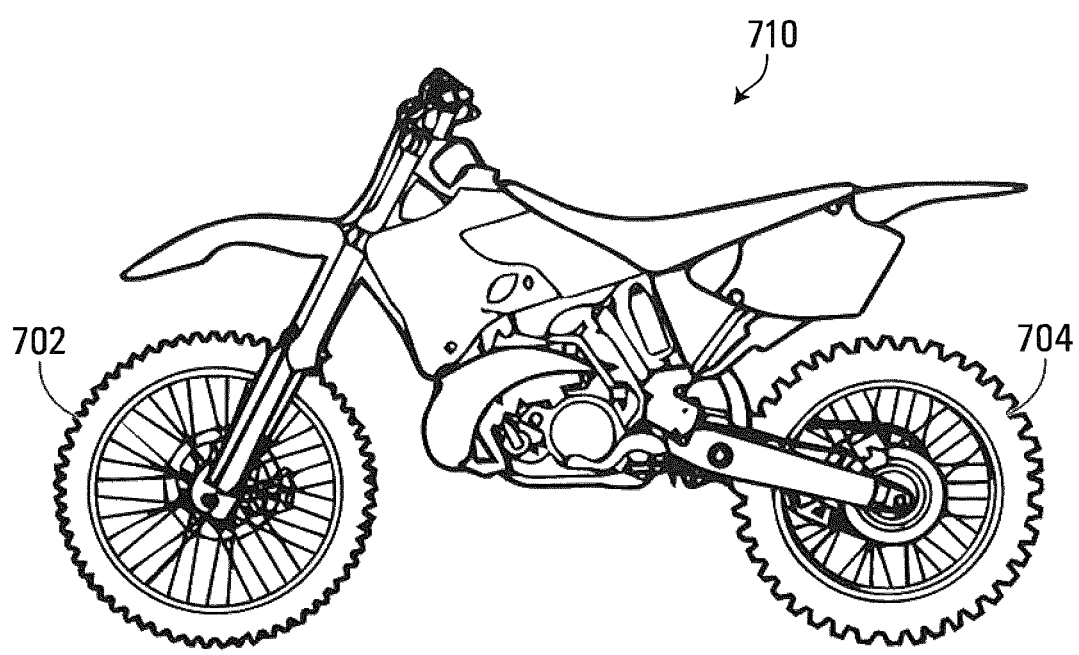
FIG. 33 shows the snow bike of FIG. 32 when it is converted to be equipped with front and rear wheels.

As another example, in some embodiments, as shown in FIGS. 31 and 32, a track system 716 comprising a track 741 constructed according to principles discussed herein may be used as part of a snow bike 710. The snow bike 710 is a motorcycle equipped with a ski system 717 mounted in place of a front wheel 702 of the motorcycle and the track system 716 mounted in place of a rear wheel 704 of the motorcycle. In this example, the track system 716 also replaces a rear suspension unit (e.g., a shock absorber and a swing arm) of the motorcycle. Basically, the track system 716 converts the motorcycle into a tracked vehicle for travelling on snow.

The ATV 10 and the snowmobile 610 considered above are examples of recreational vehicles. While they can be used for recreational purposes, such recreational vehicles may also be used for utility purposes in some cases.

Also, while these examples pertain to recreational vehicles, a track system comprising a track constructed according to principles discussed herein may be used as part of tracked vehicles other than recreational ones (e.g., agricultural vehicles, construction vehicles, military vehicles, and other off-road vehicles).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track comprising:
a carcass comprising a ground-engaging outer surface for engaging the ground and an inner surface opposite to the ground-engaging outer surface; and
a plurality of traction projections projecting from the ground-engaging outer surface;
wherein: the carcass comprises elastomeric material and a plurality of reinforcements disposed within the elastomeric material; and respective ones of the reinforcements differ in bending stiffness and are positioned relative to one another such that a lateral bending stiffness of the carcass is symmetric and a longitudinal bending stiffness of the carcass is asymmetric.

2. A track for traction of a vehicle, the track comprising:
a carcass comprising a ground-engaging outer surface for engaging the ground and an inner surface opposite to the ground-engaging outer surface; and
a plurality of traction projections projecting from the ground-engaging outer surface;
wherein a lateral-bending neutral axis of the carcass and a longitudinal-bending neutral axis of the carcass are offset in a thickness direction of the track.

3. The track of claim 2, wherein the carcass comprises elastomeric material and a plurality of reinforcements disposed within the elastomeric material.

4. The track of claim 3, wherein a ratio of a bending stiffness of a first one of the reinforcements in a widthwise direction of the track and a bending stiffness of a second one of the reinforcements in the widthwise direction of the track is no more than 1.1.

5. The track of claim 3, wherein a ratio of a modulus of elasticity of a material of a first one of the reinforcements and a modulus of elasticity of a material of a second one of the reinforcements is no more than 1.1.

6. The track of claim 4, wherein a ratio of a bending stiffness of a third one of the reinforcements in a longitudinal direction of the track and a bending stiffness of a fourth one of the reinforcements in the longitudinal direction of the track is at least 1.1.

7. The track of claim 5, wherein a ratio of a modulus of elasticity of a material of a third one of the reinforcements and a modulus of elasticity of a material of a fourth one of the reinforcements is at least 1.1.

8. The track of claim 2, wherein the lateral-bending neutral axis of the carcass is closer to a centerline of the carcass than the longitudinal-bending neutral axis of the carcass in the thickness direction of the track.

9. The track of claim 8, wherein a ratio of a distance between the lateral-bending neutral axis of the carcass and the centerline of the carcass over a thickness of the carcass is no more than 0.1.

10. The track of claim 8, wherein a ratio of a distance between the lateral-bending neutral axis of the carcass and the centerline of the carcass over a thickness of the carcass is no more than 0.05.

11. The track of claim 8, wherein the longitudinal-bending neutral axis of the carcass is located closer to a given one of the inner surface and the ground-engaging outer surface than to the centerline of the carcass in the thickness direction of the track.

12. The track of claim 11, wherein the given one of the inner surface and the ground-engaging outer surface is the ground-engaging outer surface.

13. The track of claim 2, wherein a ratio of a distance between the longitudinal-bending neutral axis of the carcass and a centerline of the carcass over a thickness of the carcass is at least 0.2.

14. The track of claim 13, wherein a ratio of a distance between the longitudinal-bending neutral axis of the carcass and the centerline of the carcass over a thickness of the carcass is at least 0.4.

15. The track of claim 13, wherein a ratio of a distance between the longitudinal-bending neutral axis of the carcass and the centerline of the carcass over a thickness of the carcass is at least 0.6.

16. A track for traction of a vehicle, the track comprising:
elastomeric material;
a ground-engaging outer surface for engaging the ground;
an inner surface opposite to the ground-engaging outer surface;
a plurality of traction projections projecting from the ground-engaging outer surface; and
a layer of reinforcing fabric disposed within the elastomeric material and stiffer in a widthwise direction of the track than in a longitudinal direction of the track.

17. The track of claim 16, wherein a ratio of a stiffness of the layer of reinforcing fabric in the widthwise direction of the track over a stiffness of the layer of reinforcing fabric in the longitudinal direction of the track is at least 2.

18. The track of claim 16, wherein a ratio of a stiffness of the layer of reinforcing fabric in the widthwise direction of the track over a stiffness of the layer of reinforcing fabric in the longitudinal direction of the track is at least 4.

19. The track of claim 16, wherein a ratio of a stiffness of the layer of reinforcing fabric in the widthwise direction of the track over a stiffness of the layer of reinforcing fabric in the longitudinal direction of the track is at least 6.

20. The track of claim 16, wherein a ratio of a stiffness of the layer of reinforcing fabric in the widthwise direction of the track over a stiffness of the layer of reinforcing fabric in the longitudinal direction of the track is at least 8.

21. The track of claim 16, wherein: the layer of reinforcing fabric comprises a plurality of elongated fabric elements; and first ones of the elongated fabric elements are oriented differently and differ in stiffness from second ones of the elongated fabric elements.

22. The track of claim 21, wherein respective ones of the elongated fabric elements that are generally oriented in the widthwise direction of the track are stiffer than respective ones of the elongated fabric elements that are generally oriented in the longitudinal direction of the track.

23. The track of claim 16, wherein the layer of reinforcing fabric is woven.

24. The track of claim 21, wherein the elongated fabric elements include warp elements and weft elements which are stiffer than the warp elements.

25. The track of claim 16, wherein the layer of reinforcing fabric comprises a plurality of materials differing in stiffness.

26. The track of claim 25, wherein a ratio of a stiffness of a first one of the materials over a stiffness of a second one of the materials is at least 2.

27. The track of claim 25, wherein a ratio of a stiffness of a first one of the materials over a stiffness of a second one of the materials is at least 4.

28. The track of claim 25, wherein a ratio of a stiffness of a first one of the materials over a stiffness of a second one of the materials is at least 6.

29. The track of claim 25, wherein a ratio of a stiffness of a first one of the materials over a stiffness of a second one of the materials is at least 8.

30. The track of claim 25, wherein a ratio of a modulus of elasticity of a first one of the materials over a modulus of elasticity of a second one of the materials is at least 2.

31. The track of claim 25, wherein a ratio of a modulus of elasticity of a first one of the materials over a modulus of elasticity of a second one of the materials is at least 4.

32. The track of claim 25, wherein a ratio of a modulus of elasticity of a first one of the materials over a modulus of elasticity of a second one of the materials is at least 6.

33. The track of claim 25, wherein a ratio of a modulus of elasticity of a first one of the materials over a modulus of elasticity of a second one of the materials is at least 8.

34. The track of claim 25, wherein the layer of reinforcing fabric includes warp elements made of a first one of the materials and weft elements made of a second one of the materials that is stiffer than the first one of the materials.

35. The track of claim 25, wherein a first one of the materials is composite material.

36. The track of claim 35, wherein a second one of the materials is a non-composite material.

37. The track of claim 36, wherein the composite material is a fiber-matrix composite material.

38. The track of claim 37, wherein the fiber-matrix composite material is fiberglass.

39. The track of claim 16, wherein the layer of reinforcing fabric comprises multifilament elements and monofilament elements.

40. The track of claim 39, wherein a given one of the monofilament elements is larger in diameter than a given one of the multifilament elements.

41. The track of claim 40, wherein a ratio of a diameter of the given one of the monofilament elements over a diameter of the given one of the multifilament elements is at least 1.5.

42. The track of claim 40, wherein a ratio of a diameter of the given one of the monofilament elements over a diameter of the given one of the multifilament elements is at least 2.

43. The track of claim 40 wherein a ratio of a diameter of the given one of the monofilament elements over a diameter of the given one of the multifilament elements is at least 2.5.

44. A track for traction of a vehicle, the track comprising:
   elastomeric material;
   a ground-engaging outer surface for engaging the ground;
   an inner surface opposite to the ground-engaging outer surface;
   a plurality of traction projections projecting from the ground-engaging outer surface; and
   a layer of reinforcing woven fabric disposed within the elastomeric material and stiffer in a given one of a longitudinal direction of the track and a widthwise direction of the track than in another one of the longitudinal direction of the track and the widthwise direction of the track.

* * * * *